US007272310B2

(12) United States Patent
Maciocco et al.

(10) Patent No.: US 7,272,310 B2
(45) Date of Patent: Sep. 18, 2007

(54) GENERIC MULTI-PROTOCOL LABEL SWITCHING (GMPLS)-BASED LABEL SPACE ARCHITECTURE FOR OPTICAL SWITCHED NETWORKS

(75) Inventors: Christian Maciocco, Tigard, OR (US); Shlomo Ovadia, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 656 days.

(21) Appl. No.: 10/606,323

(22) Filed: Jun. 24, 2003

(65) Prior Publication Data
US 2004/0264960 A1 Dec. 30, 2004

(51) Int. Cl.
*H04J 14/00* (2006.01)

(52) U.S. Cl. ............................ 398/47; 398/45; 398/48; 398/51; 398/52; 398/54; 370/351; 370/352; 370/355; 370/360; 370/389

(58) Field of Classification Search ............ 398/45–58; 370/360, 252, 450–466; 359/315, 135
See application file for complete search history.

(56) References Cited

U.S. PATENT DOCUMENTS

| 5,235,592 | A | 8/1993 | Cheng et al. |
| 5,331,642 | A | 7/1994 | Valley et al. |
| 5,550,803 | A | 8/1996 | Crayford et al. |
| 5,559,796 | A | 9/1996 | Edem et al. |
| 5,646,943 | A | 7/1997 | Elwalid |
| 5,768,274 | A | 6/1998 | Murakami et al. |
| 5,838,663 | A | 11/1998 | Elwalid et al. |
| 5,970,050 | A | 10/1999 | Johnson |
| 5,978,356 | A | 11/1999 | Elwalid et al. |
| 6,111,673 | A | 8/2000 | Chang et al. |

(Continued)

FOREIGN PATENT DOCUMENTS

| CN | 1384618 A | 12/2002 |
| CN | 1406000 A | 3/2003 |
| CN | 1426189 | 6/2003 |
| EP | 0876076 | 11/1998 |

(Continued)

OTHER PUBLICATIONS

Comellas et al: IEEE Network, Mar./Apr. 2003, p. 22-27.*

(Continued)

*Primary Examiner*—Kenneth Vanderpuye
*Assistant Examiner*—Li Liu
(74) *Attorney, Agent, or Firm*—Blakely, Sokoloff, Taylor & Zafman LLP

(57) ABSTRACT

An architecture and method for performing coarse-grain reservation of lightpaths within wavelength-division-multiplexed (WDM) based photonic burst switched (PBS) networks with variable time slot provisioning. The method employs a generalized multi-protocol label switched (GMPLS)-based PBS label that includes information identifying each lightpath segment in a selected lightpath route. A resource reservation request is passed between nodes during a forward traversal of the route, wherein each node is queried to determine whether it has transmission resources (i.e., a route lightpath segment) available during a future timeframe. Soft reservations are made for each lightpath segment that is available using information contained in a corresponding label. If all lightpath segments for a selected route are available, the soft reservations turn into hard reservations. The stored reservations enable quick routing of control burst that are employed for routing data during scheduled use of the lightpaths.

18 Claims, 16 Drawing Sheets

U.S. PATENT DOCUMENTS

| | | | |
|---|---|---|---|
| 6,222,839 B1 | 4/2001 | Nakazaki et al. | |
| 6,260,155 B1 | 7/2001 | Dellacona | |
| 6,272,117 B1 | 8/2001 | Choi et al. | |
| 6,325,636 B1 | 12/2001 | Hipp et al. | |
| 6,339,488 B1 | 1/2002 | Beshai et al. | |
| 6,400,863 B1 | 6/2002 | Weinstock et al. | |
| 6,411,506 B1 | 6/2002 | Hipp et al. | |
| 6,466,586 B1 | 10/2002 | Darveau et al. | |
| 6,487,686 B1 | 11/2002 | Yamazaki et al. | |
| 6,490,292 B1 | 12/2002 | Matsuzawa | |
| 6,498,667 B1 | 12/2002 | Masucci et al. | |
| 6,519,062 B1 | 2/2003 | Yoo | |
| 6,519,255 B1 | 2/2003 | Graves | |
| 6,542,499 B1 | 4/2003 | Murphy et al. | |
| 6,615,382 B1 | 9/2003 | Kang et al. | |
| 6,671,256 B1 | 12/2003 | Xiong et al. | |
| 6,721,271 B1 | 4/2004 | Beshai et al. | |
| 6,721,315 B1 | 4/2004 | Xiong et al. | |
| 6,842,424 B1 | 1/2005 | Key et al. | |
| 6,873,797 B2 | 3/2005 | Chang et al. | |
| 6,898,205 B1* | 5/2005 | Chaskar et al. | 370/450 |
| 6,925,257 B2 | 8/2005 | Yoo | |
| 6,956,868 B2* | 10/2005 | Qiao | 370/466 |
| 6,987,770 B1 | 1/2006 | Yonge, III | |
| 6,990,071 B2 | 1/2006 | Adam et al. | |
| 7,035,537 B2 | 4/2006 | Wang et al. | |
| 7,106,968 B2 | 9/2006 | Lahav et al. | |
| 2002/0018263 A1 | 2/2002 | Ge et al. | |
| 2002/0018468 A1 | 2/2002 | Nishihara | |
| 2002/0023249 A1 | 2/2002 | Ternullo et al. | |
| 2002/0027686 A1 | 3/2002 | Wada et al. | |
| 2002/0063924 A1 | 5/2002 | Kimbrough et al. | |
| 2002/0109878 A1 | 8/2002 | Qiao | |
| 2002/0126337 A1 | 9/2002 | Uematsu et al. | |
| 2002/0141400 A1 | 10/2002 | DeMartino | |
| 2002/0150099 A1 | 10/2002 | Pung et al. | |
| 2002/0154360 A1* | 10/2002 | Liu | 359/135 |
| 2002/0186433 A1 | 12/2002 | Mishra | |
| 2002/0186695 A1 | 12/2002 | Schwartz et al. | |
| 2002/0196808 A1 | 12/2002 | Karri et al. | |
| 2003/0002499 A1 | 1/2003 | Cummings et al. | |
| 2003/0009582 A1 | 1/2003 | Qiao et al. | |
| 2003/0016411 A1 | 1/2003 | Zhou et al. | |
| 2003/0031198 A1 | 2/2003 | Currivan et al. | |
| 2003/0037297 A1 | 2/2003 | Araki | |
| 2003/0039007 A1 | 2/2003 | Ramadas et al. | |
| 2003/0053475 A1 | 3/2003 | Veeraraghavan et al. | |
| 2003/0099243 A1 | 5/2003 | Oh et al. | |
| 2003/0120799 A1 | 6/2003 | Lahav et al. | |
| 2003/0189933 A1* | 10/2003 | Ozugur et al. | 370/395.1 |
| 2003/0214979 A1 | 11/2003 | Kang et al. | |
| 2004/0004966 A1 | 1/2004 | Foster et al. | |
| 2004/0062263 A1 | 4/2004 | Charcranoon el al. | |
| 2004/0131061 A1 | 7/2004 | Matsuoka et al. | |
| 2004/0156325 A1 | 8/2004 | Perkins et al. | |
| 2004/0156390 A1 | 8/2004 | Prasad et al. | |
| 2004/0208171 A1 | 10/2004 | Ovadia et al. | |
| 2004/0208554 A1 | 10/2004 | Wakai et al. | |
| 2005/0068995 A1 | 3/2005 | Lahav et al. | |
| 2005/0152349 A1 | 7/2005 | Takeuchi et al. | |
| 2005/0259571 A1 | 11/2005 | Battou | |
| 2006/0008273 A1 | 1/2006 | Xue et al. | |

FOREIGN PATENT DOCUMENTS

| | | |
|---|---|---|
| EP | 1 073 306 A | 1/2001 |
| EP | 1073307 | 1/2001 |
| EP | 1089498 | 4/2001 |
| EP | 1122971 | 8/2001 |
| EP | 1135000 | 9/2001 |
| EP | 1217862 | 6/2002 |
| EP | 1303111 | 4/2003 |
| EP | 1 351 458 A1 | 10/2003 |
| WO | WO 01/19006 | 3/2001 |
| WO | WO 01/67694 | 9/2001 |
| WO | WO 01/76160 A1 | 10/2001 |
| WO | WO 01/86998 A | 11/2001 |
| WO | WO 02/41663 | 5/2002 |
| WO | WO 02/067505 | 8/2002 |

OTHER PUBLICATIONS

Qiao: Labeled Optical Burst Switching for IP-over-WDM Integration, IEEE Communications Magazine, Sep. 20, 2000, p. 104-114.*

Banerjee et al Generalized Multiprotocol Label Switching: An Overview of Routing and Management Enhancements, IEEE Communications Magazine, Jan. 2001, p. 144-1150.*

Kim et al: Discrete Event Simulation of the DiffServ-over-MPLS with NIST GMPLS Lightwave Agile Switching Simulator (GLASS), Joint Conference of Communication and Information-2002, Jeju, Korea.*

Comellas et al: "Integrated IP/WDM Routing in GMPLS-Based Optical Networks", IEEE Network Mar./Apr. 2003, p. 22-27.*

Qiao: "Labeled Optical Burst Switching for IP-over-WDM Integration", IEEE Communications Magazine, Sep. 20, 2000. p. 104-114.*

Banerjee et al: "Generalized Multiprotocol Label Switching: An Overview of Routing and Management Enhancements", IEEE Communications Magazine Jan. 2001, p. 144-1150.*

Kim et al: "Discrete Event Simulation of the DiffServ-over-MPLS with NIST GMPLS Lightwave Agile Switching Simulator (GLASS)", Joint Conference of Communication and Information-2002, Jeju, Korea.*

Chaskar, H. M. et al., "Robust Transport of IP Traffic Over WDM using Optical Burst Switching", Optical Networks Magazine, Jul./Aug. 2002, pp. 47-60.

Sahara, A. et al., "Demonstration of Optical Burst Data Switching Using Photenic MPLS Routers Operated by GMPLS Signaling", Optical Society of America/Institute of Electrical and Electronics Engineers, Optical Fiber Communication Conference, 2003, pp. 220-222, vol. 1.

Comellas, J. et al., "Integrated IP/WDM Routing in GMPLS-Based Optical Networks", IEEE Network, Mar./Apr. 2003, pp. 22-27.

WEI Wei et al., "GMPLS-Based Hierarchical Optical Routing Switching Architecture", Proceedings of SPIE, 2001, pp. 328-334, vol. 4585.

International Search Report, PCT/US2004/018182, Oct. 5, 2004.

Ghani, Nasir et al., "On IP-over-WDM Integration", IEEE Communications Magazine, Mar. 2000, pp. 72-84.

Yoo, S.J. Ben, "Optical-label switching, MPLS, MPLambdaS, and GMPLS", Optical Networks Magazine, May/Jun. 2003, 99. 17-31.

Rekhter, Y. et al., "A Border Gateway Protocol 4 (BGP-4)", Network Working Group, Mar. 1995, pp. 1-57.

Office Action mailed on Nov. 29, 2006. Ovadia et al., "Architecture, Method and System of Multiple High-Speed Servers to Network in WDM Based Photonic Burst-Switched Networks," U.S. Appl. No. 10/417,823, filed Apr. 16, 2003.

Cao, Xiaojun et al., "Assembling TCP/IP Packets in Optical Burst Switched Networks", IEEE Global Telecommunications Conference, New York, 2002, vol. 1, pp. 2808-2812.

Wang, S.Y., "Using TCP Congestion Control to Improve the Performance of Optical Burst Switched Networks", IEEE International Conference on Communications, Taiwan, 2003, pp. 1438-1442.

Detti, Andrea et al., "Impact of Segments Aggregation on TCP Reno Flows in Optical Burst Switching Networks", IEEE Infocom, New York, 2002, vol. 1, pp. 1803-1805.

Ovadia et al., "Dynamic Route Discovery for Optical Switched Networks," U.S. Appl. No. 10/691,712, filed Oct. 22, 2003, Office Action mailed on Nov. 14, 2006.

Ovadia et al., "Architecture and Method for Framing Optical Control and Data Bursts Within Optical Transport Unit Structures in Photonic Burst-Switched Networks," U.S. Appl. No. 10/441,771, filed May 19, 2003, Office Action mailed on Nov. 15, 2006.

Maciocco et al., "Adaptive Framework for Closed-Loop Protocols Over Photonic Burst Switched Networks," U.S. Appl. No. 10/464,969, filed Jun. 18, 2003, Office Action mailed on Nov. 22, 2006.

O'Mahony, Mike J. et al., "The Application of Optical Packet Switching in Future Communication Networks", IEEE Communications Magazine, Mar. 2001, pp. 128-135.

Yao, Shun et al., "All-Optical Packet Switching for Metropolitan Area Networks: Opportunities and Challenges", IEEE Communications Magazine, Mar. 2001, pp. 142-148.

Qiao, Chunming et al., "Optical Burst Switching", Business Briefing: Global Photonics Applications and Technology, pp. 108-112. Nov. 2001.

Carena, A. et al., "OPERA: An Optical Packet Experimental Routing Architecture with Label Swapping Capability", Journal of Lightwave Technology, vol. 16, No. 12, Dec. 1998, pp. 2135-2145.

Zhong, Wen De, "A New Wavelength-Routed Photonic Packet Buffer Combining Traveling Delay Lines with Delay-Line Loops", Journal of Lightwave Technology, vol. 19, No. 8, Aug. 2001, pp. 1085-1092.

Wiesmann, D. et al., "Apodized Surface-Corrugated Gratings with Varying Duty Cycles", IEEE Photonics Technology Letter, vol. 12, No. 6, Jun. 2000, pp. 639-640.

Hill, Kenneth O. et al., "Fiber Bragg Grating Technology Fundamentals and Overview", Journal of Lightwave Technology, vol. 15, No. 8, Aug. 1997, pp. 1263-1276.

Erdogan, Turan, "Fiber Grating Spectra", Journal of Lightave Technology, vol. 15, No. 8, Aug. 1997, pp. 1277-1294.

Sugden, K. et al., "Fabrication and Characterization of Bandpass Filters Based on Concatenated Chirped Faber Gratings", Journal of Lightwave Technology, vol. 15, No. 8, Aug. 1997, pp. 1424-1432.

Giles, C.R., "Lightwave Applications of Fiber Bragg Gratings", Journal of Lightwave Technology, vol. 15, No. 8, Aug. 1997, pp. 1391-1404.

Willner, A. E. et al., "Tunable Compensation of Channel Degrading Effects Using Nonlineary Chirped Passive Fiber Bragg Gratings", IEEE Journal of Selected Topics in Quantum Electronics, vol. 5, No. 5, Sep./Oct. 1999, pp. 1298-1311.

Studenkov, P. V. et al., "Asymmetric Twin-Waveguide 1.55 μm Wavelength Laser with a Distributed Bragg Reflector", IEEE Photonics Technology Letters, vol. 12, No. 5, May 2000, pp. 468-470.

Shibata, Yasuo et al., "Coupling Coefficient Modulation of Waveguide Grating Using Sampled Grating", IEEE Photonics Technology Letters, vol. 6, No. 10, Oct. 1994, pp. 1222-1224.

Oh, Se-Yoon et al., "A Data Burst Assembly Algorithm in Optical Burst Switching Networks," ETRI Journal, vol. 24, No. 4, Aug. 2002, pp. 311-322, Electronics and Telecommunications Research Institute, Tejon, Korea.

IETF Networking Group RFC Standards Track, "Generalized Multi-Protocol Label Switching (GMPLS) Signaling Functional Description," Jan. 2003. Retrieved on Jul. 8, 2004 from http://www.ietf.org/rfc/rfc3471.txt.

Liu, Hang et al., "GMPLS-Based Control Plane for Optical Networks: Early Implementation Experience," Proceedings of the SPIE, vol. 4872, Jul. 29, 2002, pp. 220-229, SPIE, Bellingham, VA, US.

Gallaher, Rick, "An Introduction to MPLS", Course Director for Global Knowledge and President of Telecommunications Technical Services, Inc., Sep. 10, 2001, pp. 1-7.

"Compare SANs to Alternate Technologies", Brocade, Retrieved on Feb. 26, 2003 from http://www.brocade.com/san/evaluate/compare_san.jsp.

Ravi Kumar Khattar, et, "Introduction to Storage Area Network, SAN", International Technical Support Organization, Aug. 1999, www.redbooks.ibm.com.

Qiao, C. et al., "Polymorphic Control for Cost-Effective Design of Optical Networks", European transactions on Telecommunications, vol. 11, No. 1, Jan.-Feb. 2000, pp. 17-26.

Baldine, I. et al., "Jumpstart: A Just-in-Time Signaling Architecture for WDM Burst-Switched Networks", IEEE Communications Magazine, Feb. 2002, pp. 82-89.

Cidon, I. et al., "Connection Establishment in High-Speed Networks", IEEE/ACM Transactions on Networking, No. 4, Aug. 1993, pp. 469-481.

Floyd, Sally et al., "Modifying TCP's Congestion Control for High Speeds", May 5, 2002, pp. 1-5. Aug., 2001.

FredJ, S. Ben et al., "Statistical Bandwith Sharing: A Study of Congestion at Flow Level", France Telecom R&D, pp. 111-122.

Zeljkovic, Nada et al., "A Simulation Analysis of Statistical Multiplexing in Frame Relay and ATM Internetworking", TELESIKS 2001, Sep. 19-21, 2001, Nis, Yugoslavia, pp. 116-119.

Kumaran, Krishnan et al., "Multiplexing Regulated Traffic Streams: Design and Performance", Bell Laboratories/Lucent Technology, IEEE INFOCOM 2001, pp. 527-536.

Su, C.-F. et al., "On Statistical Multiplexing, Traffic Mixes, and VP Management", University of Texas at Austin, 1998 IEEE.

Brown, Timothy X., "Adaptive Statistical Multiplexing for Broadband Communication", Performance Evaluation and Application of ATM Networks, Kouvatsos, D. editor, Kluwer, 2000, pp. 51-80.

Walch, Philip F., "FEC Standards and Long Haul STM-64 DWDM Transmission," Contribution to T1 Standards Project T1X1.5, Jan. 17-20, 2000, pp. 1-4.

"Itu-T Rec. G.709/Y.1331—Interfaces for the Optical Transport Network (OTN)", International Telecommunication Union, Mar. 2003, pp. 1-109.

Henderson, Michael, "Forward Error Correction in Optical Network," Mar. 27, 2001. http://members.cox.net/michaeo.henderson/Papers/Optical_FEC.pdf, pp. 1-18.

Ovadia et al., "Architecture and Method for Framing Control and Data Bursts Over 10 GBIT Ethernet With and Without Wan Interface Sublayer Support", U.S. Appl. No. 10/459,781, filed Jun. 11, 2003, Office Action mailed on Oct. 18, 2006.

Maciocco et al., "Method and System to Frame and Format Optical Control and Data Bursts in WDM-Based Photonic Burst Switched Networks", U.S. Appl. No. 10/377,580, filed Feb. 28, 2003, Final Office Action mailed on Oct. 26, 2006.

Office Action mailed on Dec. 29, 2006, Ovadia et al., "Modular Reconfigurable Multi-Server System and Method for High-Speed Networking within Photonic Burst-Switched Networks," U.S. Appl. No. 10/418,487, filed Apr. 17, 2003.

Office Action mailed on Jan. 3, 2007. Ovadia et al., "Method and System to Recover Resources in the Event of Data Burst Loss Within WDM-Based Optical-Switched Networks," U.S. Appl. No. 10/668,874, filed Sep. 23, 2003.

Office Action mailed on Jan. 10, 2007. Maciocco et al., "Generic Multi-Protocol Label Switching (GMPLS) Signaling Extensions for Optical Switched Networks," U.S. Appl. No. 10/636,062, filed Aug. 6, 2003.

* cited by examiner

OPTICAL DATA BURST FORMAT

OPTICAL CONTROL BURST FORMAT

GENERIC MULTI-PROTOCOL LABEL SWITCHING (GMPLS)-BASED LABEL SPACE ARCHITECTURE FOR OPTICAL SWITCHED NETWORKS

CROSS REFERENCE TO RELATED APPLICATIONS

The present application is related to U.S. patent application Ser. No. 10/126,091, filed Apr. 17, 2002; U.S. patent application Ser. No. 10/183,111, filed Jun. 25, 2002; U.S. patent application Ser. No. 10/328,571, filed Dec. 24, 2002; U.S. patent application Ser. No. 10/377,312 filed Feb. 28, 2003; U.S. patent application Ser. No. 10/377,580 filed Feb. 28, 2003; U.S. patent application Ser. No. 10/417,823 filed Apr. 16, 2003; U.S. patent application Ser. No. 10/417,487 filed Apr. 17, 2003; U.S. patent application Ser. No. filed May 19, 2003, and U.S. patent application Ser. No. filed Jun. 18, 2003.

FIELD OF THE INVENTION

An embodiment of the present invention relates to optical networks in general; and, more specifically, to label space architecture for generic multi-protocol label switching (GMPLS) within photonic burst-switched networks.

BACKGROUND INFORMATION

Transmission bandwidth demands in telecommunication networks (e.g., the Internet) appear to be ever increasing and solutions are being sought to support this bandwidth demand. One solution to this problem is to use fiber-optic networks, where wavelength-division-multiplexing (WDM) technology is used to support the ever-growing demand in optical networks for higher data rates.

Conventional optical switched networks typically use wavelength routing techniques, which require that optical-electrical-optical (O-E-O) conversion of optical signals be done at the optical switches. O-E-O conversion at each switching node in the optical network is not only very slow operation (typically about ten milliseconds), but it is very costly, and potentially creates a traffic bottleneck for the optical switched network. In addition, the current optical switch technologies cannot efficiently support "bursty" traffic that is often experienced in packet communication applications (e.g., the Internet).

A large communication network can be implemented using several sub-networks. For example, a large network to support Internet traffic can be divided into a large number of relatively small access networks operated by Internet service providers (ISPs), which are coupled to a number of metropolitan area networks (Optical MANs), which are in turn coupled to a large "backbone" wide area network (WAN). The optical MANs and WANs typically require a higher bandwidth than local-area networks (LANs) in order to provide an adequate level of service demanded by their high-end users. However, as LAN speeds/bandwidth increase with improved technology, there is a need for increasing MAN/WAN speeds/bandwidth.

Recently, optical burst switching (OBS) schemes have emerged as a promising solution to support high-speed bursty data traffic over WDM optical networks. The OBS scheme offers a practical opportunity between the current optical circuit-switching and the emerging all optical packet switching technologies. It has been shown that under certain conditions, the OBS scheme achieves high-bandwidth utilization and class-of-service (CoS) by elimination of electronic bottlenecks as a result of the O-E-O conversion occurring at switching nodes, and by using one-way end-to-end bandwidth reservation scheme with variable time slot duration provisioning scheduled by the ingress nodes. Optical switching fabrics are attractive because they offer at least one or more orders of magnitude lower power consumption with a smaller form factor than comparable O-E-O switches. However, most of the recently published work on OBS networks focuses on the next-generation backbone data networks (i.e. Internet wide network) using high capacity (i.e., 1 Tb/s) WDM switch fabrics with large number of input/output ports (i.e., 256×256), optical channels (i.e., 40 wavelengths), and requiring extensive buffering. Thus, these WDM switches tend to be complex and very expensive to manufacture. In contrast, there is a growing demand to support a wide variety of bandwidth-demanding applications such as storage area networks (SANs) and multimedia multicast at a low cost for both local and wide-area networks.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the following detailed descriptions, embodiments of the invention are disclosed with reference to their use in a photonic burst-switched (PBS) network. A PBS network is a type of optical switched network, typically comprising a high-speed hop and span-constrained network, such as an enterprise network. The term "photonic burst" is used herein to refer to statistically-multiplexed packets (e.g., Internet protocol (IP) packets or Ethernet frames) having similar routing requirements. Although conceptually similar to backbone-based OBS networks, the design, operation, and performance requirements of these high-speed hop and span-constrained networks may be different. However, it will be understood that the teaching and principles disclosed herein may be applicable to other types of optical switched networks as well.

Figure 1:
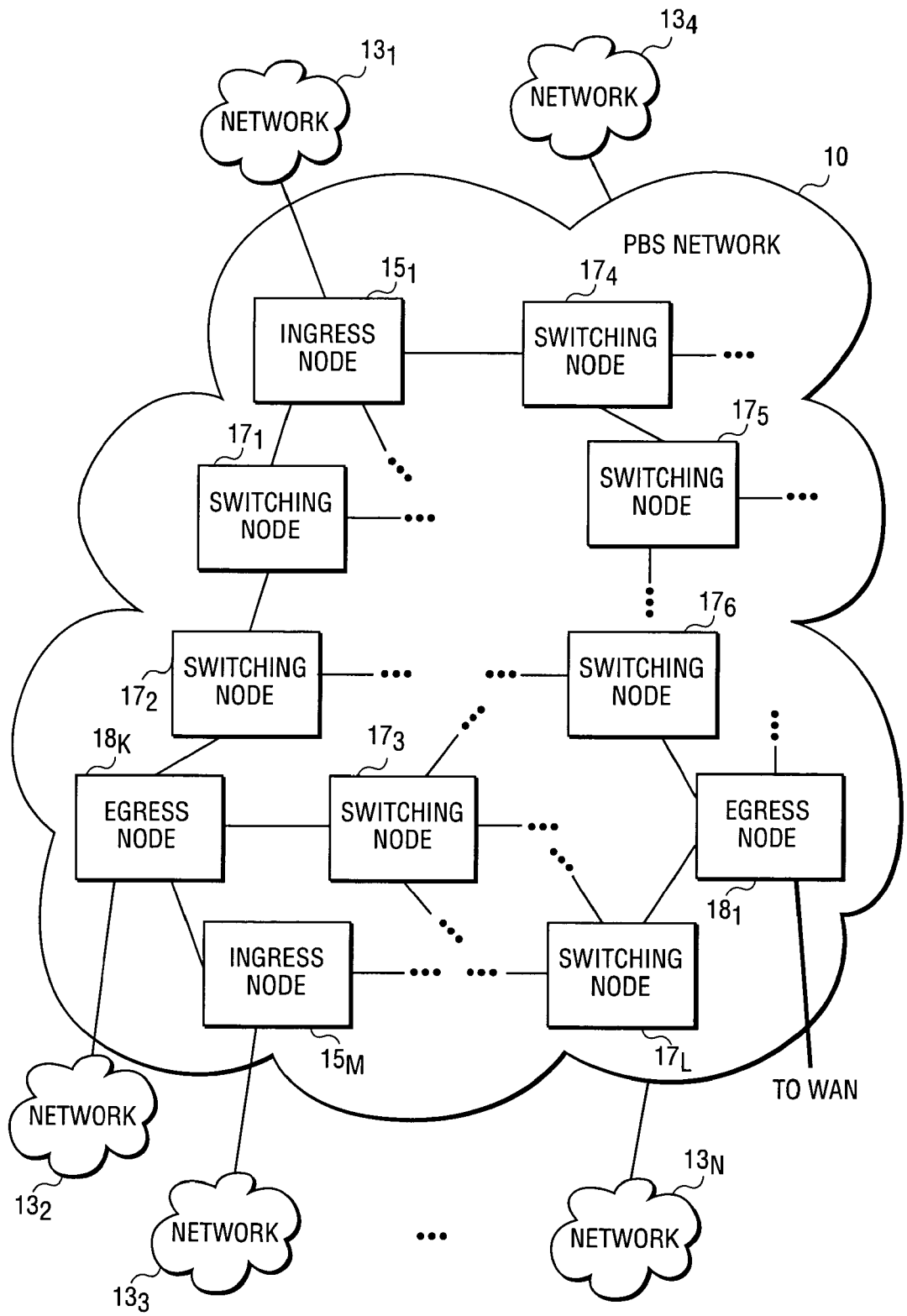
FIG. 1 is a simplified block diagram illustrating a photonic burst-switched (PBS) network with variable time slot provisioning, according to one embodiment of the present invention.

FIG. 1 illustrates an exemplary photonic burst-switched (PBS) network 10 in which embodiments of the invention described herein may be implemented. A PBS network is a type of optical switched network. This embodiment of PBS network 10 includes local area networks (LANs) $13_1$-$13_N$ and a backbone optical WAN (not shown). In addition, this embodiment of PBS network 10 includes ingress nodes $15_1$-$15_M$, switching nodes $17_1$-$17_L$, and egress nodes $18_1$-$18_K$. PBS network 10 can include other ingress, egress and switching nodes (not shown) that are interconnected with the switching nodes shown in FIG. 1. The ingress and egress nodes are also referred to herein as edge nodes in that they logically reside at the edge of the PBS network. The edge nodes, in effect, provide an interface between the aforementioned "external" networks (i.e., external to the PBS network) and the switching nodes of the PBS network. In this embodiment, the ingress, egress and switching nodes are implemented with intelligent modules. This embodiment can be used, for example, as a metropolitan area network connecting a large number of LANs within the metropolitan area to a large optical backbone network.

In some embodiments, the ingress nodes perform optical-electrical (O-E) conversion of received optical signals, and include electronic memory to buffer the received signals until they are sent to the appropriate LAN. In addition, in some embodiments, the ingress nodes also perform electrical-optical (E-O) conversion of the received electrical signals before they are transmitted to switching nodes $17_1$-$17_M$ of PBS network 10.

Egress nodes are implemented with optical switching units or modules that are configured to receive optical signals from other nodes of PBS network 10 and route them to the optical WAN or other external networks. Egress nodes can also receive optical signals from the optical WAN or other external network and send them to the appropriate node of PBS network 10. In one embodiment, egress node $18_1$ performs O-E-O conversion of received optical signals, and includes electronic memory to buffer received signals until they are sent to the appropriate node of PBS network 10 (or to the optical WAN).

Switching nodes $17_1$-$17_L$ are implemented with optical switching units or modules that are each configured to receive optical signals from other switching nodes and appropriately route the received optical signals to other switching nodes of PBS network 10. As is described below, the switching nodes perform O-E-O conversion of optical control bursts and network management control burst signals. In some embodiments, these optical control bursts and network management control bursts are propagated only on preselected wavelengths. The preselected wavelengths do not propagate optical "data" bursts (as opposed to control bursts and network management control bursts) signals in such embodiments, even though the control bursts and network management control bursts may include necessary information for a particular group of optical data burst signals. The control and data information is transmitted on separate wavelengths in some embodiments (also referred to herein as out-of-band (OOB) signaling). In other embodiments, control and data information may be sent on the same wavelengths (also referred to herein as in-band (IB) signaling). In another embodiment, optical control bursts, network management control bursts, and optical data burst signals may be propagated on the same wavelength(s) using different encoding schemes such as different modulation formats, etc. In either approach, the optical control bursts and network management control bursts are sent asynchronously relative to its corresponding optical data burst signals. In still another embodiment, the optical control bursts and other control signals are propagated at different transmission rates as the optical data signals.

Although switching nodes $17_1$-$17_L$ may perform O-E-O conversion of the optical control signals, in this embodiment, the switching nodes do not perform O-E-O conversion of the optical data burst signals. Rather, switching nodes $17_1$-$17_L$ perform purely optical switching of the optical data burst signals. Thus, the switching nodes can include electronic circuitry to store and process the incoming optical control bursts and network management control bursts that were converted to an electronic form and use this information to configure photonic burst switch settings, and to properly route the optical data burst signals corresponding to the optical control bursts. The new control bursts, which replace the previous control bursts based on the new routing information, are converted to an optical control signal, and it is transmitted to the next switching or egress nodes. Embodiments of the switching nodes are described further below.

Elements of exemplary PBS network 10 are interconnected as follows. LANs $13_1$-$13_N$ are connected to corresponding ones of ingress nodes $15_1$-$15_M$. Within PBS network 10, ingress nodes $15_1$-$15_M$ and egress nodes $18_1$-$18_K$ are connected to some of switching nodes $17_1$-$17_L$ via optical fibers. Switching nodes $17_1$-$17_L$ are also interconnected to each other via optical fibers in mesh architecture to form a relatively large number of lightpaths or optical links between the ingress nodes, and between ingress nodes $15_1$-$15_L$ and egress nodes $18_1$-$18_K$. Ideally, there are more than one lightpath to connect the switching nodes $17_1$-$17_L$ to each of the endpoints of PBS network 10 (i.e., the ingress nodes and egress nodes are endpoints within PBS network 10). Multiple lightpaths between switching nodes, ingress nodes, and egress nodes enable protection switching when one or more node fails, or can enable features such as primary and secondary route to destination.

As described below in conjunction with FIG. 2, the ingress, egress and switching nodes of PBS network 10 are configured to send and/or receive optical control bursts, optical data burst, and other control signals that are wavelength multiplexed so as to propagate the optical control bursts and control labels on pre-selected wavelength(s) and optical data burst or payloads on different preselected wavelength(s). Still further, the edge nodes of PBS network 10 can send optical control burst signals while sending data out of PBS network 10 (either optical or electrical).

Figure 2:
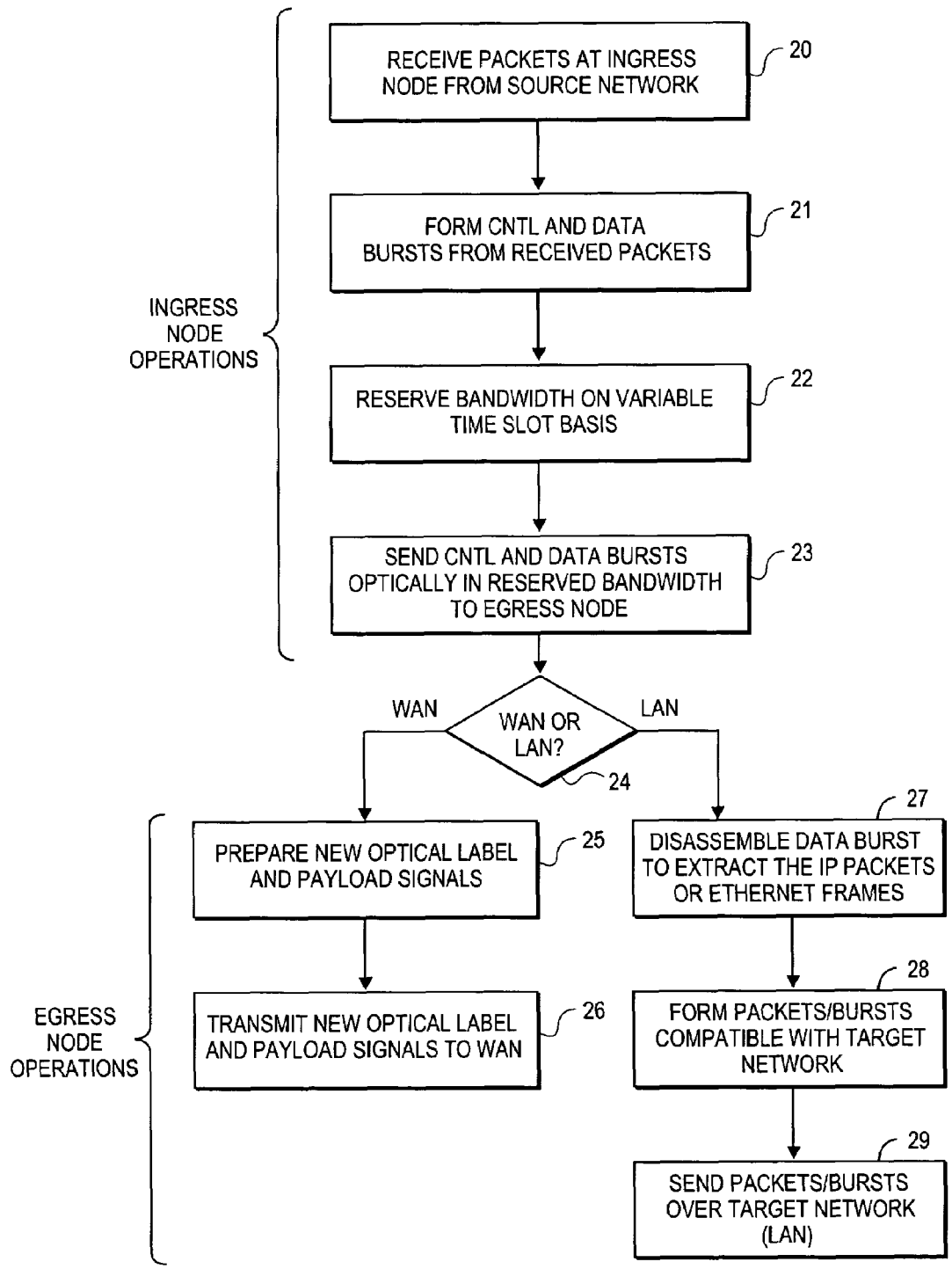
FIG. 2 is a simplified flow diagram illustrating the operation of a photonic burst-switched (PBS) network, according to one embodiment of the present invention.

FIG. 2 illustrates the operational flow of PBS network 10, according to one embodiment of the present invention. Referring to FIGS. 1 and 2, photonic burst switching network 10 operates as follows.

PBS network 10 receives packets from LANs $13_1$-$13_N$. In one embodiment, PBS network 10 receives IP packets at ingress nodes $15_1$-$15_M$. The received packets can be in electronic form rather than in optical form, or received in optical form and then converted to electronic form. In this embodiment, the ingress nodes store the received packets electronically. A block 20 represents this operation.

For clarity, the rest of the description of the operational flow of PBS network 10 focuses on the transport of information from ingress node $15_1$ to egress node $18_1$. The transport of information from ingress nodes $15_2$-$15_M$ to egress node $18_1$ (or other egress nodes) is substantially similar.

An optical burst label (i.e., an optical control burst) and optical payload (i.e., an optical data burst) is formed from the received packets. In one embodiment, ingress node $15_1$ uses statistical multiplexing techniques to form the optical data burst from the received IP (Internet Protocol) packets stored in ingress node $15_1$. For example, packets received by ingress node $15_1$ and having to pass through egress node $18_1$, on their paths to a destination can be assembled into an optical data burst payload. A block 21 represents this operation.

Bandwidth on a specific optical channel and/or fiber is reserved to transport the optical data burst through PBS network 10. In one embodiment, ingress node $15_1$ reserves a time slot (i.e., a time slot of a TDM system) in an optical data signal path through PBS network 10. This time slot maybe fixed-time duration and/or variable-time duration with either uniform or non-uniform timing gaps between adjacent time slots. Further, in one embodiment, the bandwidth is reserved for a time period sufficient to transport the optical burst from the ingress node to the egress node. For example, in some embodiments, the ingress, egress, and switching nodes maintain an updated list of all used and available time slots. The time slots can be allocated and distributed over multiple wavelengths and optical fibers. Thus, a reserved time slot (also referred to herein as a TDM channel), that in different embodiments may be of fixed-duration or variable-duration, may be in one wavelength of one fiber, and/or can be spread across multiple wavelengths and multiple optical fibers. A block 22 represents this operation.

When an ingress and/or egress node reserves bandwidth or when bandwidth is released after an optical data burst is transported, a network controller (not shown) updates the list. In one embodiment, the network controller and the ingress or egress nodes perform this updating process using various burst or packet scheduling algorithms based on the available network resources and traffic patterns. The available variable-duration TDM channels, which are periodically broadcasted to all the ingress, switching, and egress nodes, are transmitted on the same wavelength as the optical control bursts or on a different common preselected wavelength throughout the optical network. The network controller function can reside in one of the ingress or egress nodes, or can be distributed across two or more ingress and/or egress nodes. In this embodiment, the network controller is part of control unit 37 (FIG. 3), which can include one or more processors.

The optical control bursts, network management control labels, and optical data bursts are then transported through photonic burst switching network 10 in the reserved time slot or TDM channel. In one embodiment, ingress node $15_1$ transmits the control burst to the next node along the optical label-switched path (OLSP) determined by the network controller. In this embodiment, the network controller uses a constraint-based routing protocol [e.g., multi-protocol label switching (MPLS)] over one or more wavelengths to determine the best available OLSP to the egress node.

In one embodiment, the control label (also referred to herein as a control burst) is transmitted asynchronously ahead of the photonic data burst and on a different wavelength and/or different fiber. The time offset between the control burst and the data burst allows each of the switching nodes to process the label and configure the photonic burst switches to appropriately switch before the arrival of the corresponding data burst. The term photonic burst switch is used herein to refer to fast optical switches that do not use O-E-O conversion.

In one embodiment, ingress node $15_1$ then asynchronously transmits the optical data bursts to the switching nodes where the optical data bursts experience little or no time delay and no O-E-O conversion within each of the switching nodes. The optical control burst is always sent before the corresponding optical data burst is transmitted.

In some embodiments, the switching node may perform O-E-O conversion of the control bursts so that the node can extract and process the routing information contained in the label. Further, in some embodiments, the TDM channel is propagated in the same wavelengths that are used for propagating labels. Alternatively, the labels and payloads can be modulated on the same wavelength in the same optical fiber using different modulation formats. For example, optical labels can be transmitted using non-return-to-zero (NRZ) modulation format, while optical payloads are transmitted using return-to-zero (RZ) modulation format. The optical burst is transmitted from one switching node to another switching node in a similar manner until the optical control and data bursts are terminated at egress node $18_1$. A block 23 represents this operation.

The operational flow at this point depends on whether the target network is an optical WAN or a LAN. A block 24 represents this branch in the operational flow.

If the target network is an optical WAN, new optical label and payload signals are formed. In this embodiment, egress node $18_1$ prepares the new optical label and payload signals. A block 25 represents this operation.

The new optical label and payload are then transmitted to the target network (i.e., WAN in this case). In this embodiment, egress node $18_1$ includes an optical interface to transmit the optical label and payload to the optical WAN. A block 26 represents this operation.

However, if in block 24 the target network is a LAN, the optical data burst is disassembled to extract the IP packets or Ethernet frames. In this embodiment, egress node $18_1$ converts the optical data burst to electronic signals that egress node $18_1$ can process to recover the data segment of each of the packets. A block 27 represents this operation.

The extracted IP data packets or Ethernet frames are processed, combined with the corresponding IP labels, and then routed to the target network (i.e., LAN in this case). In this embodiment, egress node $18_1$ forms these new IP packets. A block 28 represents this operation. The new IP packets are then transmitted to the target network (i.e., LAN) as shown in block 29.

PBS network 10 can achieve increased bandwidth efficiency through the additional flexibility afforded by the TDM channels. Although this exemplary embodiment described above includes an optical MAN having ingress, switching and egress nodes to couple multiple LANs to an optical WAN backbone, in other embodiments the networks do not have to be LANs, optical MANs or WAN backbones. That is, PBS network 10 may include a number of relatively small networks that are coupled to a relatively larger network that in turn is coupled to a backbone network.

Figure 3:
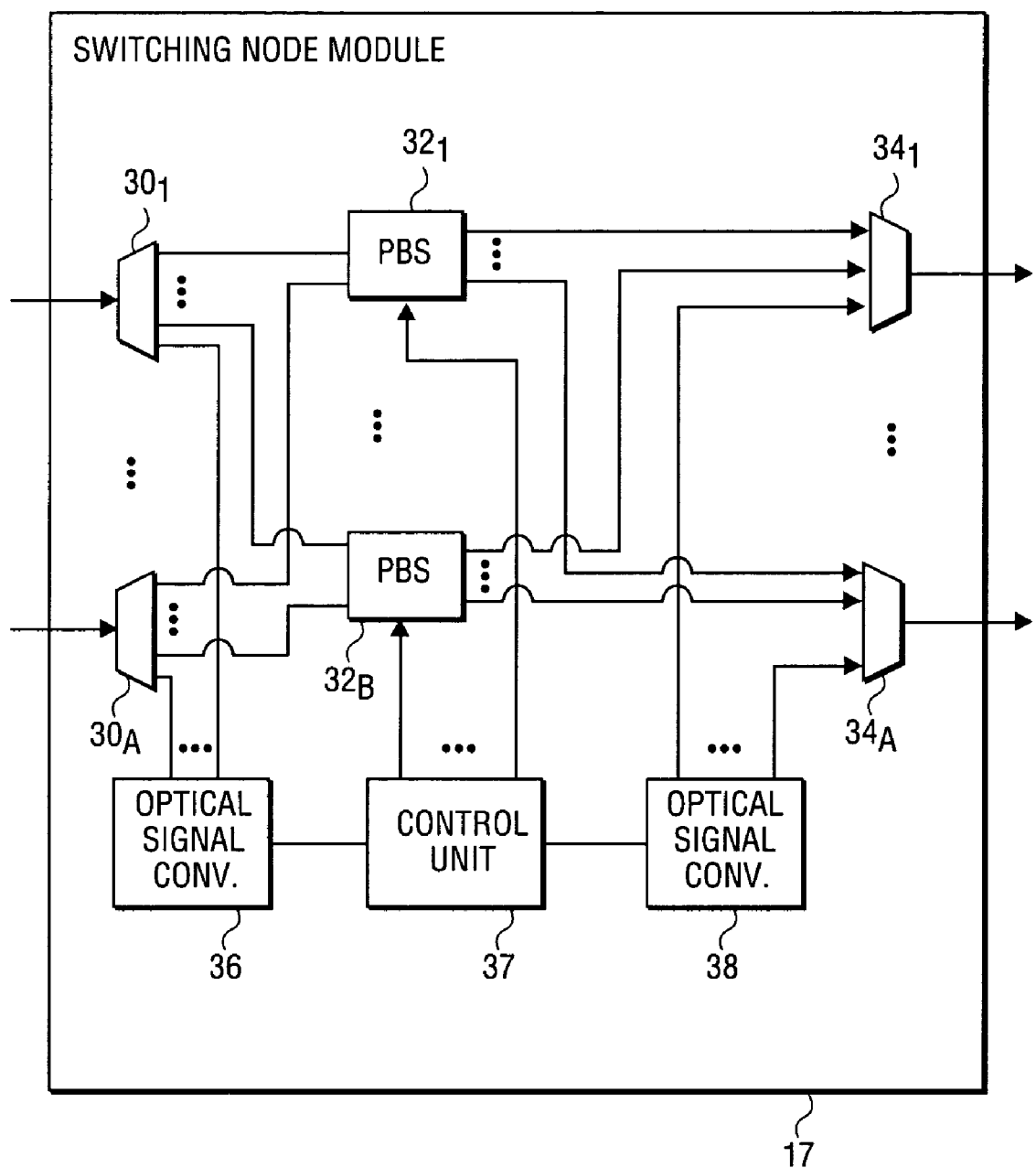
FIG. 3 is a block diagram illustrating a switching node module for use in a photonic burst-switched (PBS) network, according to one embodiment of the present invention.

FIG. 3 illustrates a module 17 for use as a switching node in photonic burst switching network 10 (FIG. 1), according to one embodiment of the present invention. In this embodiment, module 17 includes a set of optical wavelength division demultiplexers $30_1$-$30_A$, where A represents the number of input optical fibers used for propagating payloads, labels, and other network resources to the module. For example, in this embodiment, each input fiber could carry a set of C wavelengths (i.e., WDM wavelengths), although in other embodiments the input optical fibers may carry differing numbers of wavelengths. Module 17 would also include a set of N×N photonic burst switches $32_1$-$32_B$, where N is the number of input/output ports of each photonic burst switch. Thus, in this embodiment, the maximum number of wavelengths at each photonic burst switch is A·C, where $N \geq A \cdot C+1$. For embodiments in which N is greater than A·C, the extra input/output ports can be used to loop back an optical signal for buffering.

Further, although photonic burst switches $32_1$-$32_B$ are shown as separate units, they can be implemented as N×N photonic burst switches using any suitable switch architecture. Module 17 also includes a set of optical wavelength division multiplexers $34_1$-$34_A$, a set of optical-to-electrical signal converters 36 (e.g., photo-detectors), a control unit 37, and a set of electrical-to-optical signal converters 38 (e.g., lasers). Control unit 37 may have one or more processors to execute software or firmware programs. Further details of control unit 37 are described below.

Figure 10:
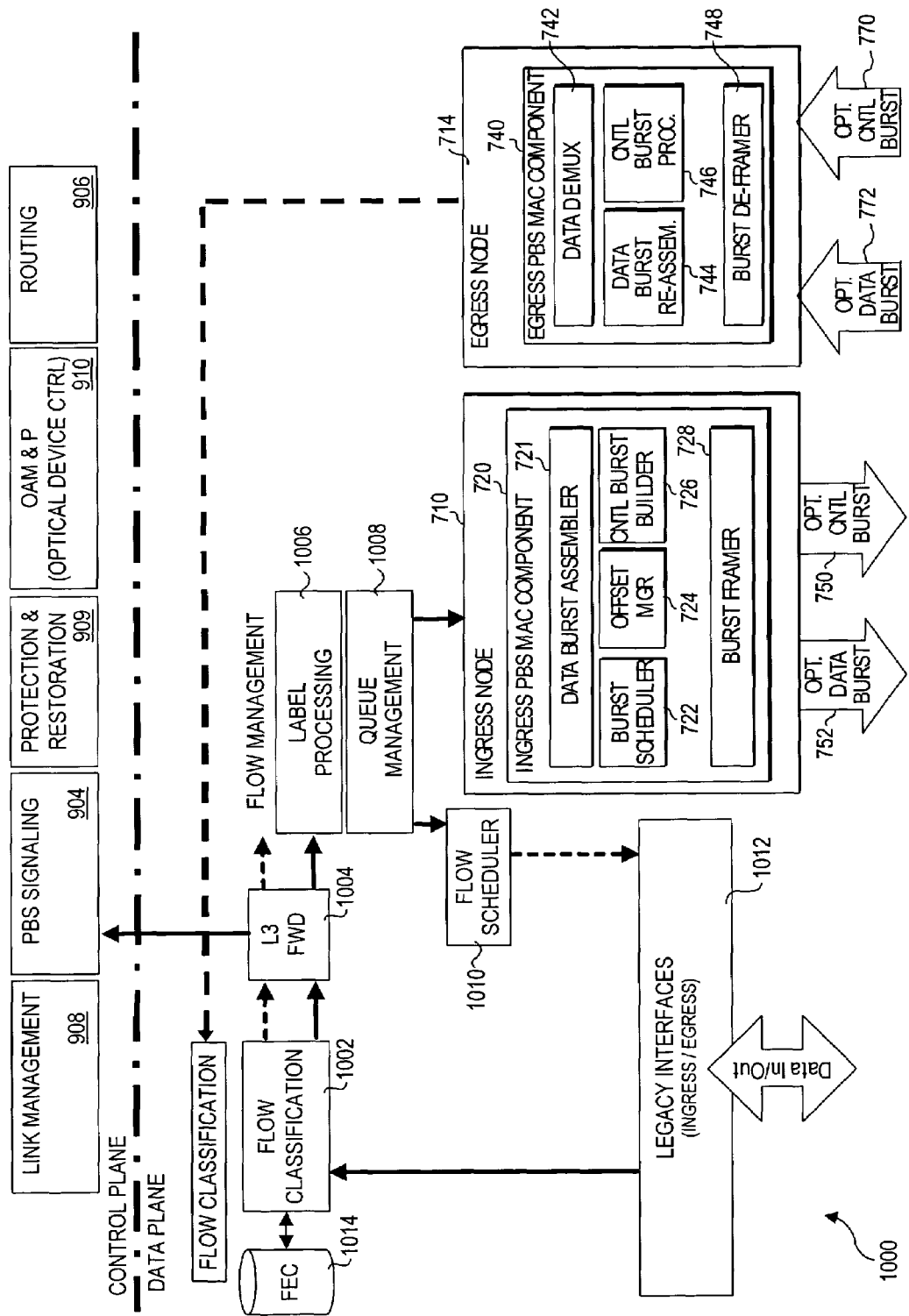
FIG. 10 is a schematic diagram illustrating an integrated data and control-plane PBS software architecture, according to one embodiment of the present invention.

The elements of this embodiment of module 17 are interconnected as follows. Optical demultiplexers $30_1$-$30_A$ are connected to a set of A input optical fibers that propagate input optical signals from other switching nodes of photonic burst switching network 10 (FIG. 10). The output leads of the optical demultiplexers are connected to the set of B core optical switches $32_1$-$32_B$ and to optical signal converter 36. For example, optical demultiplexer $30_1$ has B output leads connected to input leads of the photonic burst switches $32_1$-$32_B$ (i.e., one output lead of optical demultiplexer $30_1$ to one input lead of each photonic burst switch) and at least one output lead connected to optical signal converter 36.

The output leads of photonic burst switches $32_1$-$32_B$ are connected to optical multiplexers $34_1$-$34_A$. For example, photonic burst switch $32_1$ has A output leads connected to input leads of optical multiplexers $34_1$-$34_A$ (i.e., one output lead of photonic burst switch $32_1$ to one input lead of each optical multiplexer). Each optical multiplexer also an input lead connected to an output lead of electrical-to-optical signal converter 38. Control unit 37 has an input lead or port connected to the output lead or port of optical-to-electrical signal converter 36. The output leads of control unit 37 are connected to the control leads of photonic burst switches $32_1$-$32_B$ and electrical-to-optical signal converter 38. As described below in conjunction with the flow diagram of FIG. 5, module 17 is used to receive and transmit optical control bursts, optical data bursts, and network management control bursts. In one embodiment, the optical data bursts and optical control bursts have transmission formats as shown in FIGS. 4 and 5.

Figure 4:
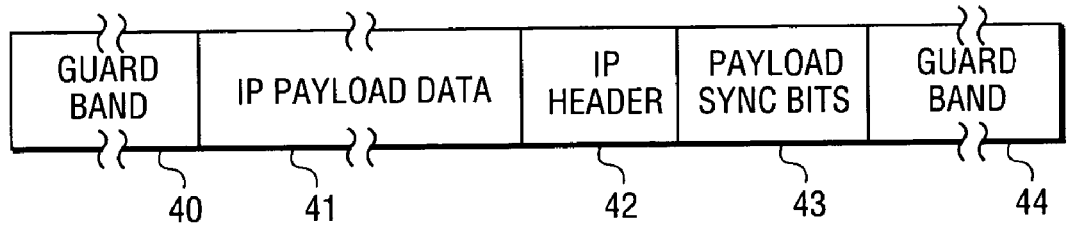
FIG. 4 is a diagram illustrating the format of an optical data burst for use in a photonic burst-switched network, according to one embodiment of the present invention.

FIG. 4 illustrates the format of an optical data burst for use in PBS network 10 (FIG. 1), according to one embodiment of the present invention. In this embodiment, each optical data burst has a start guard band 40, an IP payload data segment 41, an IP header segment 42, a payload sync segment 43 (typically a small number of bits), and an end guard band 44 as shown in FIG. 4A. In some embodiments, IP payload data segment 41 includes the statistically-multiplexed IP data packets or Ethernet frames used to form the burst. Although FIG. 4A shows the payload as contiguous, module 17 transmits payloads in a TDM format. Further, in some embodiments the data burst can be segmented over multiple TDM channels. It should be pointed out that in this embodiment the optical data bursts and optical control bursts have local significance only in PBS network 10, and may loose their significance at the optical WAN.

Figure 5:
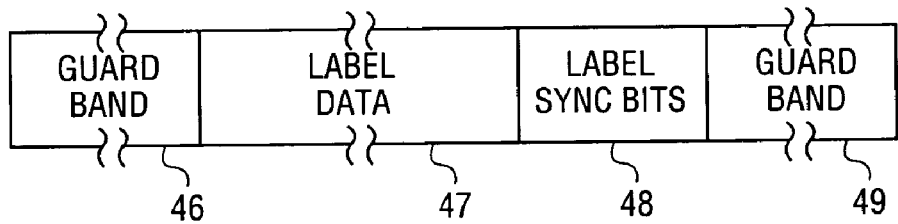
FIG. 5 is a diagram illustrating the format of an optical control burst for use in a photonic burst-switched network, according to one embodiment of the present invention.

FIG. 5 illustrates the format of an optical control burst for use in photonic burst switching network 10 (FIG. 1), according to one embodiment of the present invention. In this embodiment, each optical control burst has a start guard band 46, an IP label data segment 47, a label sync segment 48 (typically a small number of bits), and an end guard band 49 as shown in FIG. 5. In this embodiment, label data segment 45 contains all the necessary routing and timing information of the IP packets to form the optical burst. Although FIG. 5 shows the payload as contiguous, in this embodiment module 17 transmits labels in a TDM format.

In some embodiments, an optical network management control label (not shown) is also used in PBS network 10 (FIG. 1). In such embodiments, each optical network management control burst includes: a start guard band similar to start guard band 46; a network management data segment similar to data segment 47; a network management sync segment (typically a small number of bits) similar to label sync segment 48; and an end guard band similar to end guard band 44. In this embodiment, network management data segment contains network management information needed to coordinate transmissions over the network. In some embodiments, the optical network management control burst is transmitted in a TDM format.

Figure 6:
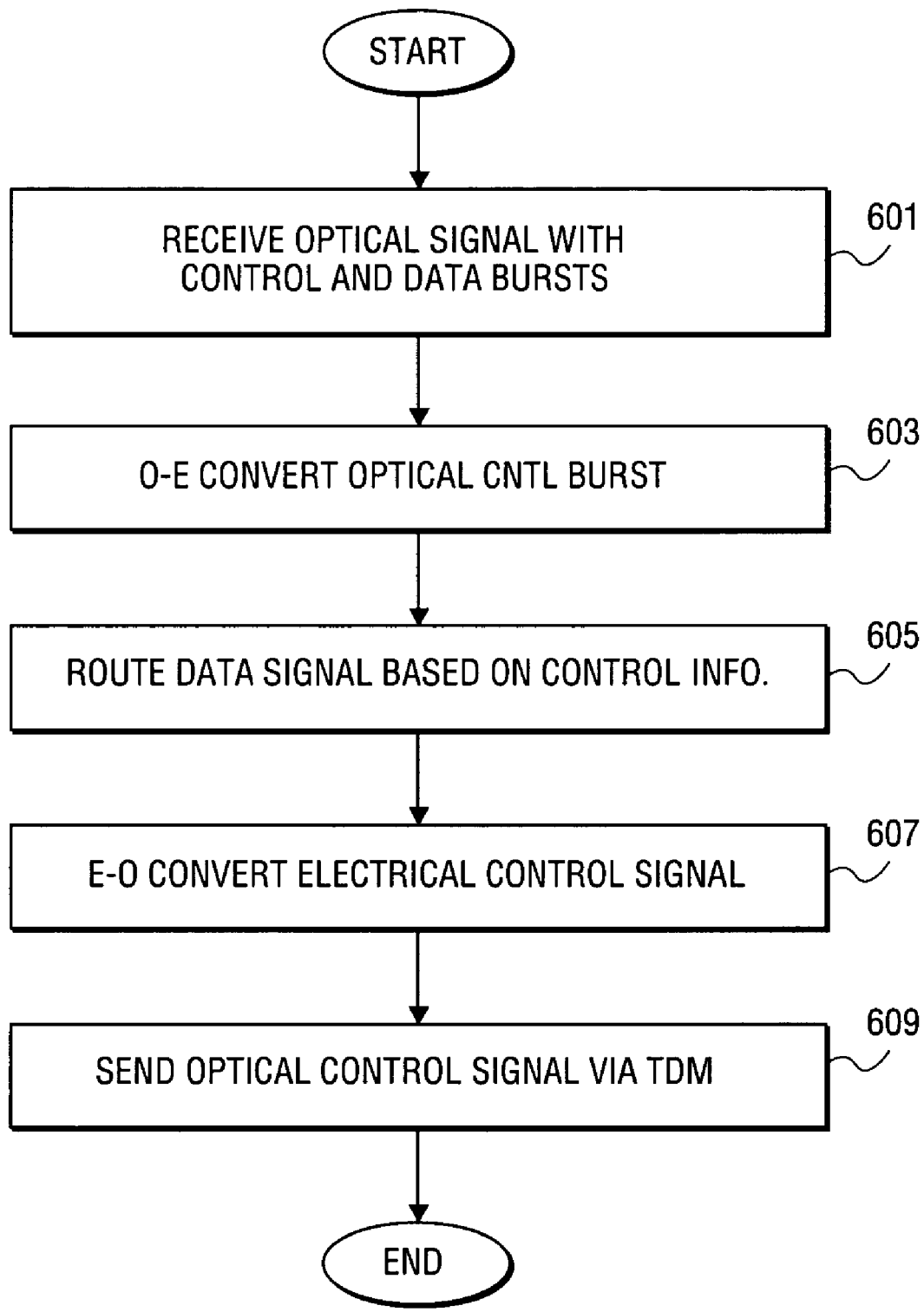
FIG. 6 is a flow diagram illustrating the operation of a switching node module, according to one embodiment of the present invention.

FIG. 6 illustrates the operational flow of module 17 (FIG. 3), according to one embodiment of the present invention. Referring to FIGS. 3 and 6, module 17 operates as follows.

Module 17 receives an optical signal with TDM label and data signals. In this embodiment, module 17 receives an optical control signal (e.g., an optical control burst) and an optical data signal (i.e., an optical data burst in this embodiment) at one or two of the optical demultiplexers. For example, the optical control signal may be modulated on a first wavelength of an optical signal received by optical demultiplexer $30_A$, while the optical data signal is modulated on a second wavelength of the optical signal received by optical demultiplexer $30_A$. In some embodiments, the optical control signal may be received by a first optical demultiplexer while the optical data signal is received by a second optical demultiplexer. Further, in some cases, only an optical control signal (e.g., a network management control burst) is received. A block 601 represents this operation.

Module 17 converts the optical control signal into an electrical signal. In this embodiment, the optical control signal is the optical control burst signal, which is separated from the received optical data signal by the optical demultiplexer and sent to optical-to-electrical signal converter 36. In other embodiments, the optical control signal can be a network management control burst (previously described in conjunction with FIG. 5). Optical-to-electrical signal converter 36 converts the optical control signal into an electrical signal. For example, in one embodiment each portion of the TDM control signal is converted to an electrical signal. The electrical control signals received by control unit 37 are processed to form a new control signal. In this embodiment, control unit 37 stores and processes the information contained in the control signals. A block 603 represents this operation.

Module 17 then routes the optical data signals (i.e., optical data burst in this embodiment) to one of optical multiplexers $34_1$-$34_A$, based on routing information contained in the control signal. In this embodiment, control unit 37 processes the control burst to extract the routing and timing information and sends appropriate PBS configuration signals to the set of B photonic burst switches $32_1$-$32_B$ to re-configure each of the photonic burst switches to switch the corresponding optical data bursts. A block 605 represents this operation.

Module 17 then converts the processed electrical control signal to a new optical control burst. In this embodiment, control unit 37 provides TDM channel alignment so that reconverted or new optical control bursts are generated in the desired wavelength and TDM time slot pattern. The new control burst may be modulated on a wavelength and/or time slot different from the wavelength and/or time slot of the control burst received in block 601. A block 607 represents this operation.

Module 17 then sends the optical control burst to the next switching node in the route. In this embodiment, electrical-to-optical signal generator 38 sends the new optical control burst to appropriate optical multiplexer of optical multiplexers $34_1$-$34_A$ to achieve the route. A block 609 represents this operation.

Figure 7:
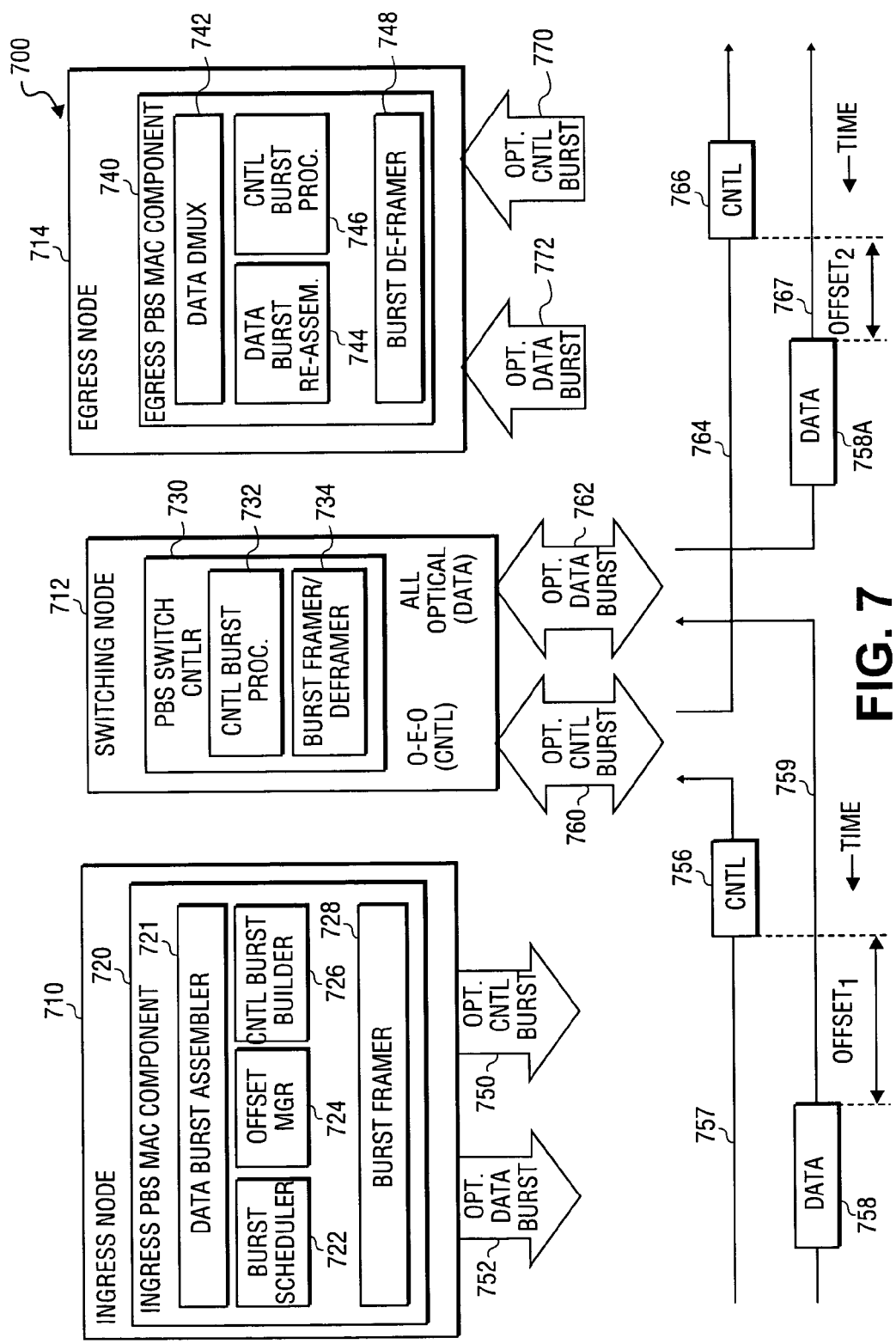
FIG. 7 is a diagram illustrating PBS optical burst flow between nodes in a PBS network, according to one embodiment of the present invention.

FIG. 7 illustrates PBS optical burst flow between nodes in an exemplary PBS network 700, according to one embodiment of the present invention. System 700 includes ingress node 710, a switching node 712, an egress node 714 and other nodes (egress, switching, and ingress that are not shown to avoid obscuring the description of the optical burst flow). In this embodiment, the illustrated components of ingress, switching and egress nodes 710, 712 and 714 are implemented using machine-readable instructions that cause a machine (e.g., a processor) to perform operations that allow the nodes to transfer information to and from other nodes in the PBS network. In this example, the lightpath for the optical burst flow is from ingress node 710, to switching node 712 and then to egress node 714.

Ingress node 710 includes an ingress PBS MAC layer component 720 having a data burst assembler 721, a data burst scheduler 722, an offset time manager 724, a control burst builder 726 and a burst framer 728. In one embodiment, data burst assembler 721 assembles the data bursts to be optically transmitted over PBS network 10 (FIG. 1). In one embodiment, the size of the data burst is determined based on many different network parameters such as quality-of-service (QoS), number of available optical channels, the size of electronic buffering at the ingress nodes, the specific burst assembly algorithm, etc.

Data burst scheduler 722, in this embodiment, schedules the data burst transmission over PBS network 10 (FIG. 1). In this embodiment, ingress PBS MAC layer component 710 generates a bandwidth request for insertion into the control burst associated with the data burst being formed. In one embodiment, data burst scheduler 722 also generates the schedule to include an offset time (from offset manager 724 described below) to allow for the various nodes in PBS network 10 to process the control burst before the associated data burst arrives.

In one embodiment, offset time manager 724 determines the offset time between the control and data bursts based on various network parameters such as, for example, the number of hops along the selected lightpath, the processing delay at each switching node, traffic loads for specific lightpaths, and class of service requirements.

Then control burst builder 726, in this embodiment, builds the control burst using information such as the required bandwidth, burst scheduling time, in-band or out-of-band signaling, burst destination address, data burst length, data burst channel wavelength, offset time, priorities, and the like.

Burst framer 728 frames the control and data bursts (using the framing format described below in conjunction with FIGS. 7-10 in some embodiments). Burst framer 728 then transmits the control burst over PBS network 10 via a physical optical interface (not shown), as indicated by an arrow 750. In this embodiment, the control burst is transmitted out of band (OOB) to switching node 712, as indicated by an optical control burst 756 and PBS TDM channel 757 in FIG. 7. Burst framer 728 then transmits the data burst according to the schedule generated by burst scheduler 722 to switching node 712 over the PBS network via the physical optical interface, as indicated by an optical burst 758 and PBS TDM channel 759 in FIG. 7. The time delay between optical bursts 756 (control burst) and 758 (data burst) in indicated as an $OFFSET_1$ in FIG. 7.

Switching node 712 includes a PBS switch controller 730 that has a control burst processing component 732, a burst framer/de-framer 734 and a hardware PBS switch (not shown).

In this example, optical control burst 756 is received via a physical optical interface (not shown) and optical switch (not shown) and converted to electrical signals (i.e., O-E conversion). Control burst framer/de-framer 734 de-frames the control burst information and provides the control information to control burst processing component 732. Control burst processing component 732 processes the information, determining the corresponding data burst's destination, bandwidth reservation, next control hop, control label swapping, etc.

PBS switch controller component 730 uses some of this information to control and configure the optical switch (not shown) to switch the optical data burst at the appropriate time duration to the next node (i.e., egress node 714 in this example) at the proper channel. In some embodiments, if the reserved bandwidth is not available, PBS switch controller component 730 can take appropriate action. For example, in one embodiment PBS switch controller 730 can: (a) determine a different lightpath to avoid the unavailable optical channel (e.g., deflection routing); (b) delay the data bursts using integrated buffering elements within the PBS switch fabric such as fiber delay lines; (c) use a different optical channel (e.g. by using tunable wavelength converters); and/or (d) drop only the coetaneous data bursts. Some embodiments of PBS switch controller component 730 may also send a negative acknowledgment message back to ingress node 710 to re-transmit the dropped burst.

However, if the bandwidth can be found and reserved for the data burst, PBS switch controller component 730 provides appropriate control of the hardware PBS switch (not shown). In addition, PBS switch controller component 730 generates a new control burst based on the updated reserved bandwidth from control burst processing component 732 and the available PBS network resources. Control burst framer/de-framer 734 then frames the re-built control burst, which is then optically transmitted to egress node 714 via the physical optical interface (not shown) and the optical switch (not shown), as indicated by PBS TDM channel 764 and an optical control burst 766 in FIG. 7.

Subsequently, when the optical data burst corresponding to the received/processed control burst is received by switching node 712, the hardware PBS switch is already configured to switch the optical data burst to egress node 714. In other situations, switching node 712 can switch the optical data burst to a different node (e.g., another switching node not shown in FIG. 7). The optical data burst from ingress node 710 is then switched to egress node 714, as indicated by PBS TDM channel 767 and an optical data burst 758A. In this embodiment, optical data burst 758A is simply optical data burst 758 re-routed by the hardware PBS switch (not shown), but possibly transmitted in a different TDM channel. The time delay between optical control burst 766 and optical data burst 758A is indicated by an $OFFSET_2$ in FIG. 7, which is smaller than $OFFSET_1$ due, for example, to processing delay and other timing errors in switching node 712.

Egress node 714 includes a PBS MAC component 740 that has a data demultiplexer 742, a data burst re-assembler 744, a control burst processing component 746, and a data burst de-framer 748.

Egress node 714 receives the optical control burst as indicated by an arrow 770 in FIG. 7. Burst de-framer 748 receives and de-frames the control burst via a physical O-E interface (not shown). In this embodiment, control burst processing component 746 processes the de-framed control burst to extract the pertinent control/address information.

After the control burst is received, egress node 714 receives the data burst(s) corresponding to the received control burst, as indicated by an arrow 772 in FIG. 7. In this example, egress node 714 receives the optical data burst after a delay of $OFFSET_2$, relative to the end of the control burst. In a manner similar to that described above for received control bursts, burst de-framer 748 receives and de-frames the data burst. Data burst re-assembler 744 then processes the de-framed data burst to extract the data (and to re-assemble the data if the data burst was a fragmented data burst). Data de-multiplexer 742 then appropriately de-multiplexes the extracted data for transmission to the appropriate destination (which can be a network other than the PBS network).

Figure 8:
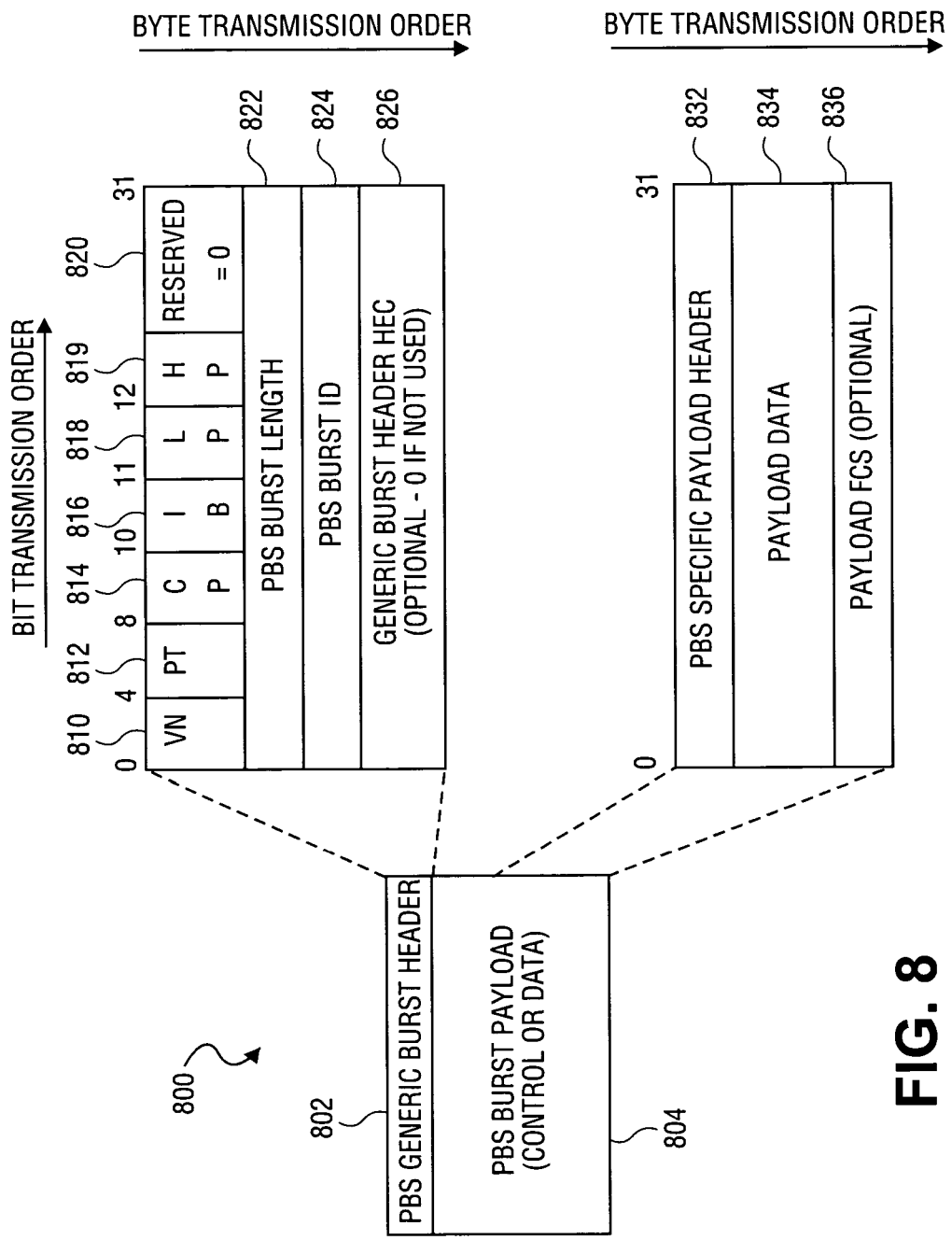
FIG. 8 is a diagram illustrating generic PBS framing format for PBS optical bursts, according to one embodiment of the present invention.

FIG. 8 illustrates a generic PBS framing format 800 for PBS optical bursts, according to one embodiment of the present invention. Generic PBS frame 800 includes a PBS generic burst header 802 and a PBS burst payload 804 (which can be either a control burst or a data burst). FIG. 8 also includes an expanded view of PBS generic burst header 802 and PBS burst payload 804.

PBS generic burst header 802 is common for all types of PBS bursts and includes a version number (VN) field 810, a payload type (PT) field 812, a control priority (CP) field 814, an in-band signaling (IB) field 816, a label present (LP) field 818, a header error correction (HEC) present (HP) field 819, a burst length field 822, and a burst ID field 824. In some embodiments, PBS generic burst header also includes a reserved field 820 and a HEC field 826. Specific field sizes and definitions are described below for framing format having 32-bit words; however, in other embodiments, the sizes, order and definitions can be different.

In this embodiment, PBS generic burst header 802 is a 4-word header. The first header word includes VN field 810, PT field 812, CP field 814, IB field 816 and LP field 818. VN field 810 in this exemplary embodiment is a 4-bit field (e.g., bits 0-3) defining the version number of the PBS Framing format being used to frame the PBS burst. In this embodiment, VN field 810 is defined as the first 4-bits of the first word, but in other embodiments, it need not be the first 4-bits, in the first word, or limited to 4-bits.

PT field 812 is a 4-bit field (bits 4-7) that defines the payload type. For example, binary "0000" may indicate that the PBS burst is a data burst, while binary "0001" indicates that the PBS burst is a control burst, and binary "0010" indicates that the PBS burst is a management burst. In this embodiment, PT field 812 is defined as the second 4-bits of the first word, but in other embodiments, it need not be the second 4-bits, in the first word, or limited to 4-bits.

CP field 814 is a 2-bit field (bits 8-9) that defines the burst's priority. For example, binary "00" may indicate a normal priority while binary "01" indicates a high priority. In this embodiment, PT field 812 is defined bits 8 and 9 of the first word, but in other embodiments, it need not be bits 8 and 9, in the first word, or limited to 2-bits.

IB field 816 is a one-bit field (bit 10) that indicates whether the PBS control burst is being signaled in-band or OOB. For example, binary "0" may indicate OOB signaling while binary "1" indicates in-band signaling. In this embodiment, IB field 816 is defined as bit 10 of the first word, but in other embodiments, it need not be bit 10, in the first word, or limited to one-bit.

LP field 818 is a one-bit field (bit 11) used to indicate whether a label has been established for the lightpath carrying this header. In this embodiment, LP field 818 is defined as bit 11 of the first word, but in other embodiments, it need not be bit 11, in the first word, or limited to one-bit.

HP field 819 is a one-bit (bit 12) used to indicate whether header error correction is being used in this control burst. In this embodiment, HP field 819 is defined as bit 12 of the first word, but in other embodiments, it need not be bit 12, in the first word, or limited to one-bit. The unused bits (bits 13-31) form field(s) 820 that are currently unused and reserved for future use.

The second word in PBS generic burst header 802, in this embodiment, contains PBS burst length field 822, which is used to store a binary value equal to the length the number of bytes in PBS burst payload 804. In this embodiment, the PBS burst length field is 32-bits. In other embodiments, PBS burst length field 822 need not be in the second word and is not limited to 32-bits.

In this embodiment, the third word in PBS generic burst header 802 contains PBS burst ID field 824, which is used to store an identification number for this burst. In this embodiment, PBS burst ID field 824 is 32-bits generated by the ingress node (e.g., ingress node 710 in FIG. 7). In other embodiments, PBS burst ID field 824 need not be in the third word and is not limited to 32-bits.

The fourth word in PBS generic burst header 802, in this embodiment, contains generic burst header HEC field 826, which is used to store an error correction word. In this embodiment, generic burst header HEC field 826 is 32-bits generated using any suitable known error correction technique. In other embodiments, generic burst header HEC field 826 need not be in the fourth word and is not limited to 32-bits. As in indicated in FIG. 8, generic burst header HEC field 826 is optional in that if error correction is not used, the field may be filled with all zeros. In other embodiments, generic burst header HEC field 826 is not included in PBS generic burst header 802.

PBS burst payload 804 is common for all types of PBS bursts and includes a PBS specific payload header field 832, a payload field 834, and a payload frame check sequence (FCS) field 836.

In this exemplary embodiment, PBS specific payload header 832 is the first part (i.e., one or more words) of PBS burst payload 804. Specific payload header field 832 for a control burst is described below in more detail in conjunction with FIG. 9. Similarly, specific payload field 832 for a data burst is described below in conjunction with FIG. 9. Typically, specific payload header field 832 includes one or more fields for information related to a data burst, which can be either this burst itself or contained in another burst associated with this burst (i.e., when this burst is a control burst).

Payload data field 834, in this embodiment, is the next portion of PBS burst payload 804. In some embodiments, control bursts have no payload data, so this field may be omitted or contain all zeros. For data bursts, payload data field 834 may be relatively large (e.g., containing multiple IP packets or Ethernet frames).

Payload FCS field 836, in this embodiment, in the next portion of PBS burst payload. In this embodiment, payload FCS field 836 is a one-word field (i.e., 32-bits) used in error detection and/or correction. As in indicated in FIG. 8, payload FCS field 836 is optional in that if error detection/correction is not used, the field may be filled with all zeros. In other embodiments, payload FCS field 836 is not included in PBS burst payload 804.

Figure 9:
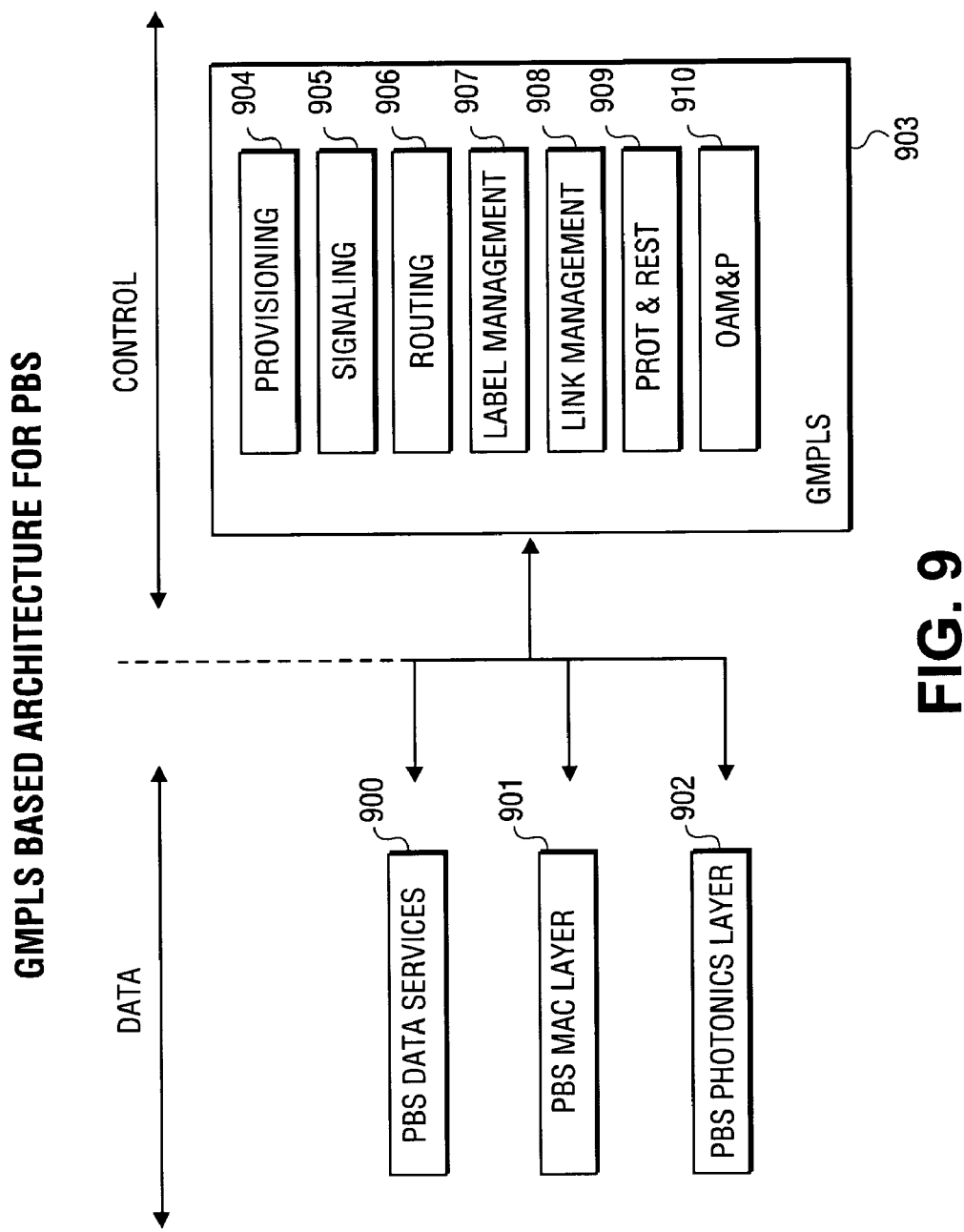
FIG. 9 is a diagram illustrating a generalized multi-protocol label switching (GMPLS)-based architecture for a PBS network, according to one embodiment of the present invention.

In accordance with further aspects of the invention, label space architecture in an extended GMPLS-based framework for a PBS network is provided. An overview of a GMPLS-based control scheme for a PBS network in which the label space architecture may be implemented in accordance with one embodiment is illustrated in FIG. 9. Starting with the GMPLS suite of protocols, each of the GMPLS protocols can be modified or extended to support PBS operations and optical interfaces while still incorporating the GMPLS protocols' various traffic-engineering tasks. The integrated PBS layer architecture include PBS data services layer 900 on top of a PBS MAC layer 901, which is on top of a PBS photonics layer 902. It is well known that the GMPLS-based protocols suite (indicated by a block 903 in FIG. 9) includes a provisioning component 904, a signaling component 905, a routing component 906, a label management component 907, a link management component 908, and a protection and restoration component 909. In some embodiments, these components are modified or have added extensions that support the PBS layers 900-902. Further, in this embodiment, GMPLS-based suite 903 is also extended to include an operation, administration, management and provisioning (OAM&P) component 910.

For example, signaling component 905 can include extensions specific to PBS networks such as, for example, burst start time, burst type, burst length, and burst priority, etc. Link management component 908 can be implemented based on the well-known link management protocol (LMP) (that currently supports only SONET/SDH networks), with extensions added to support PBS networks. Protection and restoration component 909 can, for example, be modified to cover PBS networks.

Further, for example, label management component 907 can be modified to support a PBS control channel label space. In one embodiment, the label operations are performed after control channel signals are O-E converted. The ingress nodes of the PBS network act as label edge routers (LERs) while the switching nodes act as label switch routers (LSRs). An egress node acts as an egress LER substantially continuously providing all of the labels of the PBS network. An ingress node can propose a label to be used on the lightpath segment it is connected to, but the downstream node will be the deciding one in selecting the label value, potentially rejecting the proposed label and selecting its own label. A label list can also be proposed by a node to its downstream node. This component can advantageously increase the speed of control channel context retrieval (by performing a pre-established label look-up instead of having to recover a full context). Further details of label configuration and usage are discussed below.

To enable PBS networking within hop and span-constrained networks, such as enterprise networks and the like, it is advantageous to extend the GMPLS-based protocols suite to recognize the PBS optical interfaces at both ingress/egress nodes and switching nodes. Under the GMPLS-based framework, the PBS MAC layer is tailored to perform the different PBS operations while still incorporating the MPLS-based traffic engineering features and functions for control burst switching of coarse-grain (from seconds to days or longer) optical flows established using a reservation protocol and represented by a PBS label.

FIG. 10 shows an integrated data and control-plane PBS software architecture 1000 with the key building blocks at ingress/egress nodes. Data plane components in architecture 1000 includes a flow classification block 1002, and L3 (Layer 3, i.e. the Internet layer in the networking stack) forwarding block 1004, a label processing block 1006, a queue management block 1008, a flow scheduler 1010, and legacy interfaces 1012. In addition, the data plane components include the ingress node 710 and egress node 714 components discussed above with reference to FIG. 7. GMPLS-based functionality is implemented in the control plane, which includes link management component 908, signaling component 904, protection and restoration component 909, OAM & P component 910, and routing component 906.

On the data path, packets from legacy interfaces 1012, (i.e., IP packets or Ethernet frames) are classified by flow classification block 1002 based on n-tuples classification into forward-equivalent classes (FECs) 1014 at the ingress/egress node. Specifically, an adaptive PBS MAC layer at the ingress node typically performs data burst assembly and scheduling, control burst generation, and PBS logical framing, while de-framing, de-fragmentation and flow de-multiplexing are performed at the egress node. Once classified, data corresponding to a given FEC is forwarded to L3 forward block 1004. If the flow is for this node IP address, i.e. this node L3 address then the flow is given to this node for processing, i.e., it is given to this node control plane to be processed.

The next operations concern flow management. These are handled by label processing block 1006, as described below in further detail, and queue management block 1008. Timing of when portions of data destined for legacy network components are sent is determined by flow scheduler 1010.

Figure 11:
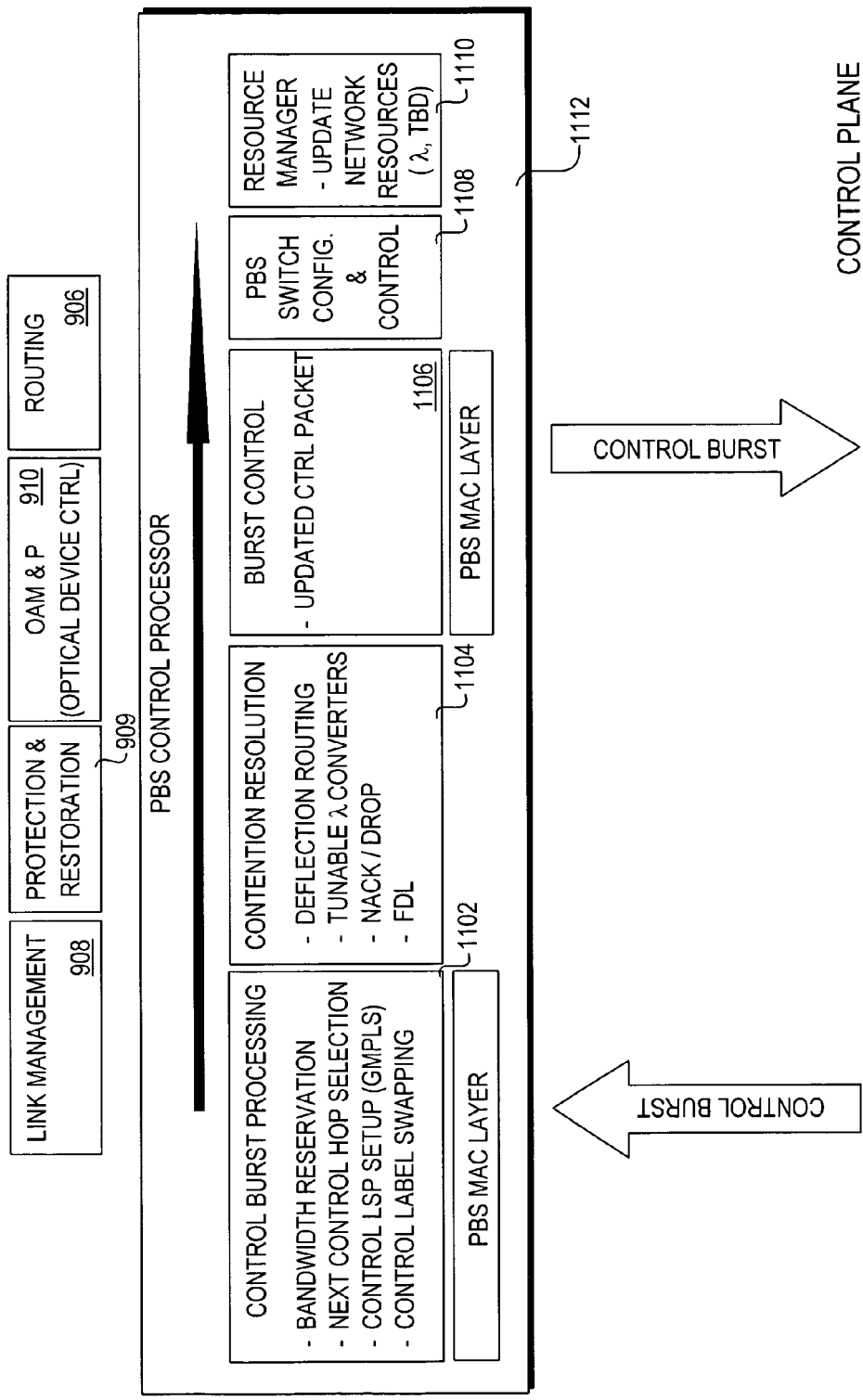
FIG. 11 is a schematic diagram illustrating PBS software architecture with the key building blocks a switching node, according to one embodiment of the present invention.

FIG. 11 illustrates PBS software architecture 1100 with the key building blocks at the switching nodes. The software architecture includes a control burst processing block 1102, a contention resolution block 1104, a burst control block 1106, a PBS switch configuration and control block 1108, and a resource manager block 1110. Operations provided by blocks 1102, 1104, 1106, 1108, and 1110 are performed by correspond sets of software (i.e. machine-executable instructions) that are executed by a PBS control processor 1112.

Control burst processing block 1102 performs bandwidth reservation, next hop selection, label-switched-path (LSP) setup in, and control label swapping accordance with GMPLS-based framework. Contention resolution block 1104 performs deflection routing, provides tunable wavelength conversion, NACK (negative acknowledgement)/drop functions and fiber delay line (FDL) operations. Burst control block 1106 provides updated control packets. PBS switch configuration and control block 1108 provides configuration and control of the PBS switch controlled by PBS control processor 1112. Resource manager block 1110 performs resource management operations, including updating network resources (bandwidth used on each wavelength, total wavelength utilization, etc).

Figure 12:
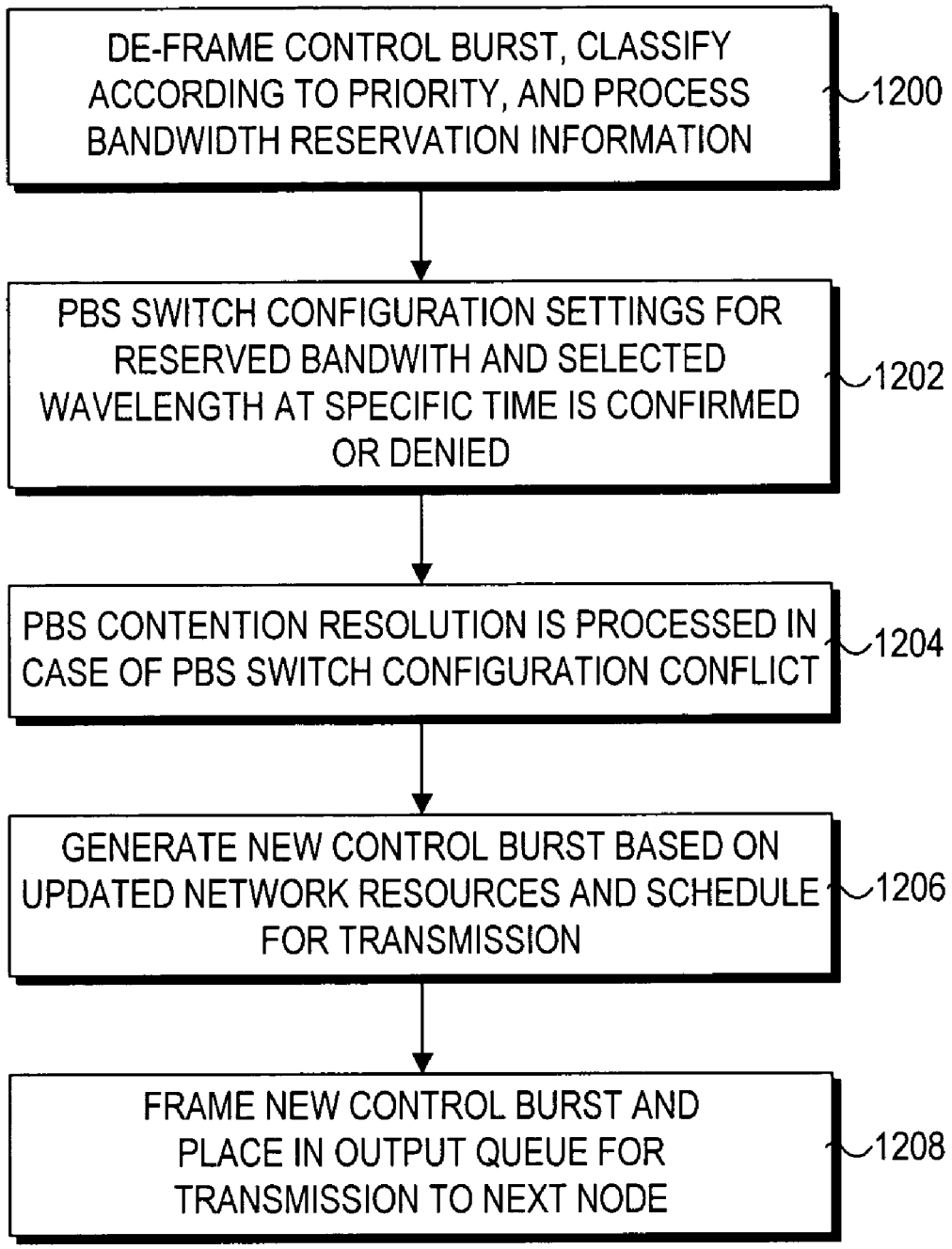
FIG. 12 is a flowchart illustrating the various operations performed in connection with the transmission and processing of control bursts, according to one embodiment of the present invention.

The transmitted PBS control bursts, which are processed electronically by the PBS Network processor (NP), undergo the following operations: With reference to the flowchart of FIG. 12, the process begins in a block 1200, wherein the control burst is de-framed, classified according to its priority, and the bandwidth reservation information is processed. If an optical flow has been signaled and established this flow label is used to lookup the relevant information. Next, in a block 1202, the PBS switch configuration settings for the reserved bandwidth on the selected wavelength at a specific time is either confirmed or denied. If confirmed, the process proceeds; if denied, a new reservation request process is initiated.

In a block 1204, PBS contention resolution is processed in case of PBS switch configuration conflict. One of the three possible contention resolution schemes, namely FDL-based buffering, tunable wavelength converters, and deflection routing can be selected. If none of these schemes are available, the incoming data bursts are dropped until the PBS switch becomes available and a negative acknowledgement message is sent to the ingress node to retransmit. A new control burst is generated in a block 1206, based on updated network resources retrieved from the resource manager, and scheduled for transmission. The new control burst is then framed and placed in the output queue for transmission to the next node in a block 1208.

Figure 13:
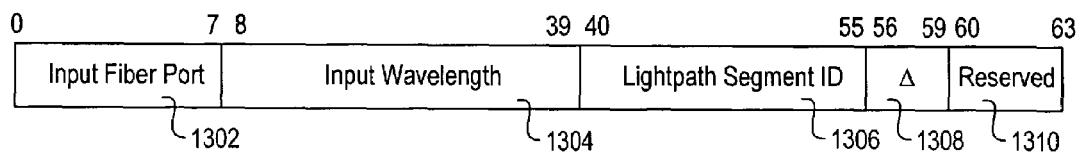
FIG. 13 is a block diagram illustrating GMPLS-based PBS label format, according to one embodiment of the present invention.

In important aspect of the present invention pertains to label signaling, whereby coarse-grain lightpaths are signaled end-to-end and assigned a unique PBS label. The PBS label has only lightpath segment significance and not end-to-end significance. In exemplary PBS label format 1300 is shown in FIG. 13 with its corresponding fields, further details of which are discussed below. The signaling of PBS labels for lightpath set-up, tear down, and maintenance is done through an extension of IETF (internet engineering task force) resource reservation protocol-traffic engineering (RSVP-TE).

The PBS label, which identifies the data burst input fiber, wavelength, and lightpath segment, channel spacing, is used on the control path to enable one to make soft reservation request of the network resources (through corresponding RESV messages). If the request is fulfilled (through the PATH message), each switching node along the selected lightpath commits the requested resources, and the lightpath is established with the appropriate segment-to-segment labels. Each switching node is responsible for updating the initial PBS label through the signaling mechanism, indicating to the previous switching node the label for its lightpath segment. If the request cannot be fulfilled or an error occurred, a message describing the condition is sent back to the originator to take the appropriate action (i.e., select another lightpath characteristics). Thus, the implementation of the PBS label through signaling enables an MPLS type efficient lookup for the control burst processing. This processing improvement of the control burst at each switching node reduces the required offset time between the control and data bursts, resulting in an improved PBS network throughput and reduced end-to-end latency.

In addition to the software blocks executed by the PBS control processor, there are several other key components that support PBS networking operations described herein. Link Management component 908 is responsible for providing PBS network transport link status information such as link up/down, loss of light, etc. The component runs its own link management protocol on the control channel. In one embodiment, the IETF link management protocol (LMP) protocol is extended to support PBS interfaces. Link protection and restoration component 909 is responsible for computing alternate optical paths among the various switching nodes based on various user-defined criteria when a link failure is reported by the link management component. OAM&P component 910 is responsible for performing various administrative tasks such as device provisioning.

Additionally, routing component 906 provides routing information to establish the route for control and data burst paths to their final destination. For PBS networks with bufferless switch fabrics, this component also plays an important role in making PBS a more reliable transport network by providing backup route information that is used to reduce contention.

The label signaling scheme of the present invention reduces the PBS offset time by reducing the amount of time it takes to process a signaled lightpath. This is achieved by extending the GMPLS model to identify each lightpath segment within the PBS network using a unique label defined in a PBS label space. The use of a PBS label speeds up the PBS control burst processing by allowing the control interface unit within the PBS switching node, which processes the control burst, to lookup relevant physical routing information and other relevant processing state based on the label information used to perform a fast and efficient lookup. Thus, each PBS switching node has access in one lookup operation to the following relevant information, among others: 1) the address of the next hop to send the control burst to; 2) information about the outgoing fiber and wavelength; 3) label to use on the next segment if working in a label-based mode; and 4) data needed to update the scheduling requirement for the specific input port and wavelength.

Returning to FIG. 13, in one embodiment PBS label 1300 comprises five fields, including an input fiber port field 1302, a input wavelength field 1304, a lightpath segment ID field 1306, a channel spacing ($\Delta$) field 1308, and a reserved field 1310. The input fiber port field 1302 comprises an 8-bit field that specifies the input fiber port of the data channel identified by the label (which itself is carried on the control wavelength. The input wavelength field 1304 comprises a 32-bit field that describes the input data wavelength used on the input fiber port specified by input fiber port field 1302, and is described in further detail below. The lightpath segment ID field 1306 comprises a 16-bit field that describes the lightpath segment ID on a specific wavelength and a fiber cable. Lightpath segment ID's are predefined values that are determined based on the PBS network topology. The channel spacing field 1308 comprises a 4-bit field used for identifying the channel spacing (i.e., separation between adjacent channels) (in connection with the Δ variable defined below. The reserved field 1310 is reserved for implementation-specific purposes and future expansion.

In one embodiment, the input wavelength is represented using IEEE (Institute of Electrical and Electronic Engineers) standard 754 for single precision floating-point format. The 32-bit word is divided into a 1-bit sign indicator S, an 8-bit biased exponent e, and a 23-bit fraction. The relationship between this format and the representation of real numbers is given by:

$$\text{Value} = \begin{cases} (-1)^S \cdot (2^{e-127}) \cdot (1+f) & \text{normalized, } 0 < e < 255 \\ (-1)^S \cdot (2^{e-126}) \cdot (0+f) & \text{denormalized, } e = 0, f > 0 \\ \text{exceptional value} & \text{otherwise} \end{cases} \quad \text{Eq. (1)}$$

One of the optical channels in the C band has a frequency of 197.200 THz, corresponding to a wavelength of 1520.25 nm. This channel is represented by setting s=0, e=134, and f=0.540625. The adjacent channel separation can be 50 GHz, 100 GHz, 200 GHz, or other spacing. For 50 GHz channel separation, it can be written as: $\Delta=0.05=1.6 \cdot 2^{-5}$ (s=0, e=122, f=0.6). Thus, the wavelength of the nth channel is given by:

$$f(n)=f(1)-(n-1)\cdot\Delta \quad \text{Eq. (2)}$$

Thus, according to equation (2), the optical channel frequency is given by n and the specific value of Δ, which can be provided as part of the initial network set-up. For example, using the standard ITU-T (International Telecommunications Union) grid C and L bands, n is limited to 249, corresponding to an optical frequency of 184.800 THz. However, other optical channel frequencies outside the above-mentioned range or other wavelength ranges such as wavelength band around 1310 nm can be also defined using equation (2).

Figure 14:
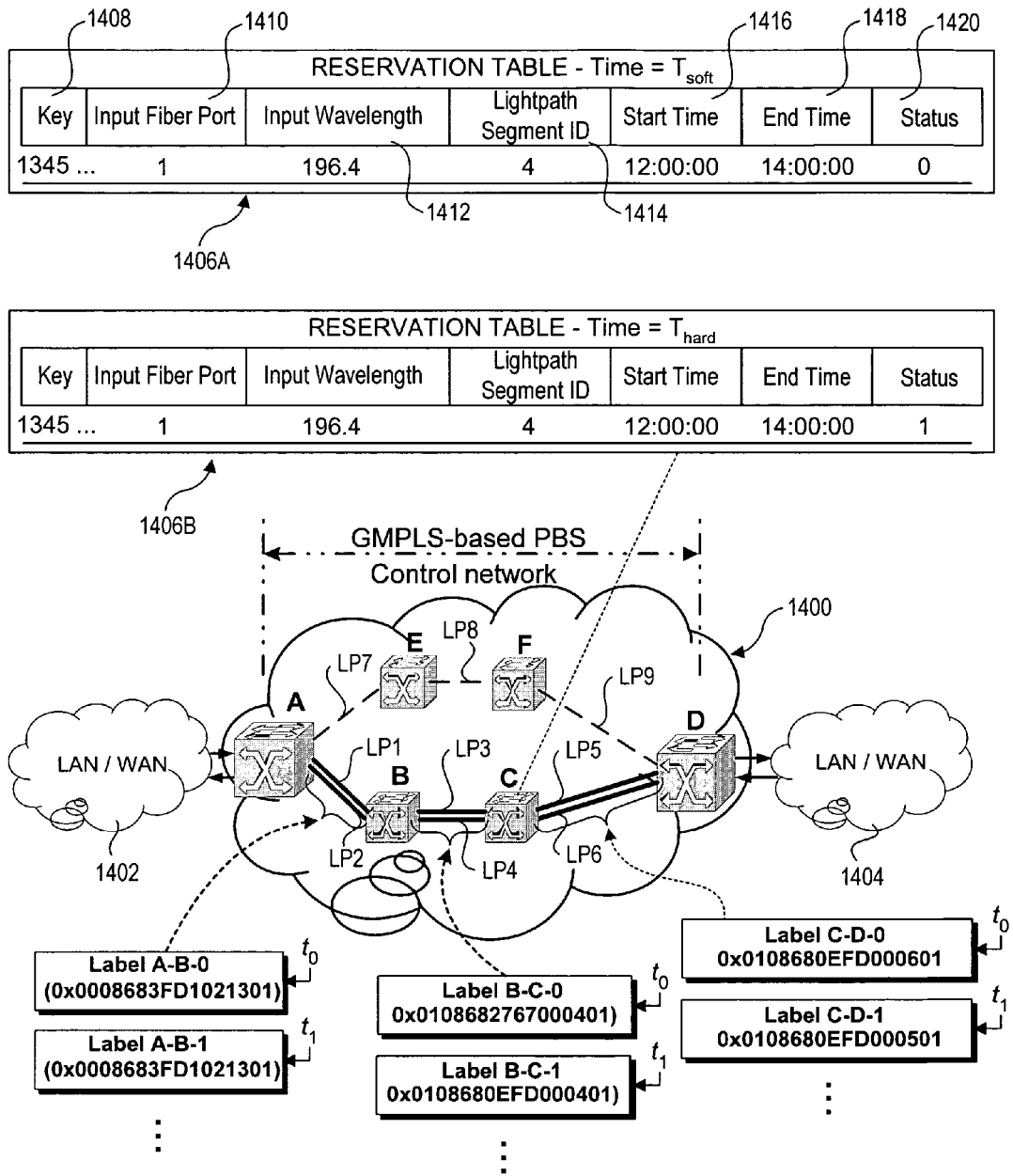
FIG. 14 is a schematic diagram illustrating an exemplary set of GMPLS-based PBS labels employed in connection with routing data across a GMPLS-based PBS control network.

Operation of how PBS label 1300 is implemented in a GMPLS-based PBS network 1400 is illustrated in FIG. 14. Network 1400, which may comprise one of various types of networks, such as an enterprise network, contains six PBS switching nodes, respectively labeled A, B, C, D, E, and F. Network 1400 is coupled at one end to a LAN or WAN network 1402 and a LAN or WAN network 1404 at another end, wherein edge nodes A and D operate as edge nodes. For the following example, it is desired to route traffic from network 1402 to network 1404. Accordingly, edge node A (a.k.a., the source node) operates as an ingress node, while edge node D (a.k.a., the destination node) operates as an egress node.

The various switching nodes B, C, E, and F are coupled by lightpath segments LP1, LP2, LP3, LP4, LP5, LP6, LP7, LP8 and LP9, as shown in FIG. 14. There are also other lightpath segments cross-connecting switching nodes B, C, E, and F, which are not shown for clarity. A lightpath segment comprises an optical coupling via optical fibers between any adjacent nodes. A lightpath comprises the path traveled between source and destination nodes, and typically will comprises a plurality of lightpath segments. In the illustrated example, the lightpath between the source node (ingress node A) and the destination node (egress node D) dynamically selected at signaling time, through the use of a well known signaling protocol such as RSVP-TE, comprises lightpath segments LP1, LP4, and LP6.

As further shown in FIG. 14, exemplary PBS labels A-B-0 and A-B-1 are assigned to the path between nodes A and B at times $t_0$ and $t_1$, respectively; labels B-C-0 and B-C-1 are assigned to the path between nodes B and C nodes at times $t_0$ and $t_1$; and labels C-D-0 and C-D-1 are assigned to the path between nodes C and D nodes at times $t_0$ and $t_1$. For the purpose of simplicity, the lightpath segment ID's for lightpath segments LP1, LP2, LP3, LP4, LP5 and LP6 are respectively defined as 0x0001, 0x0002, 0x0003, 0x0004, 0x0005, and 0x0006. In accordance with foregoing aspects of PBS networks, a particular LSP may comprise lightpath segments employing different wavelengths. As such, in the illustrated example label A-B-0 defines the use of an optical frequency of 197.2 THz (0x08683FD1), label B-C-0 defines the use of a frequency of 196.4 THz (0x08682767), and label C-D-0 defines the use of a frequency of 195.6 THz (0x08680EFD). On the way from A to D the signaling packet requests resource reservation on a lightpath segment-by-segment basis (i.e. LP1, LP4, LP6). For example, edge node A requests resources to create a coarse-grain reservation of a selected lightpath. On the first lightpath segment, switching node B checks if it has sufficient resources to satisfy the request. If it doesn't have the resources, it sends an error message back to the originator of the request to take the appropriate action such as send another request or select another lightpath. If it has enough resources, it makes a soft reservation of these resources, and forwards it to the next switching node, wherein the operations are repeated until the destination node D is reached. When node D receives the soft reservation request, it checks if it can be fulfilled.

Figure 15A:
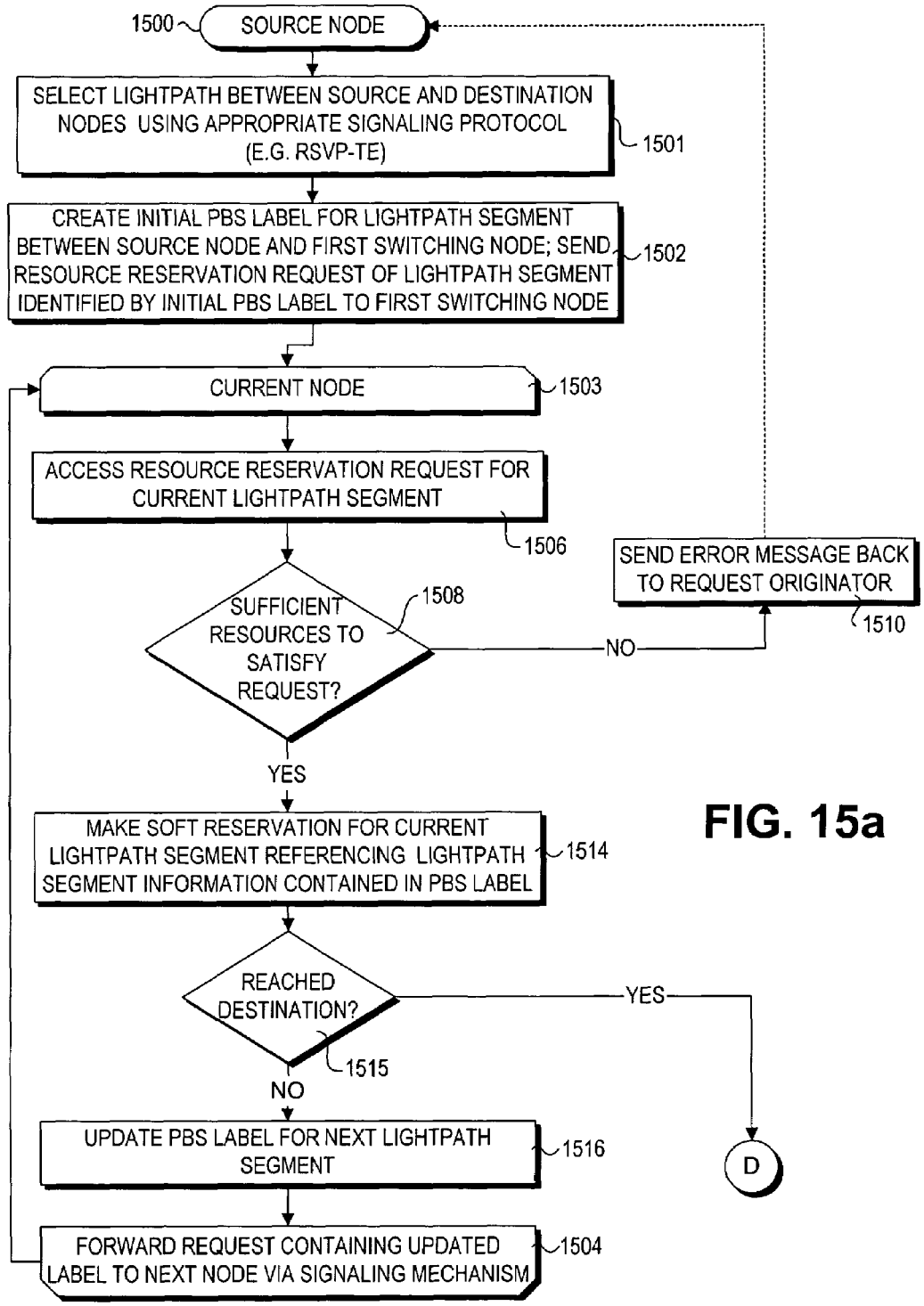
FIGS. 15a and 15b collectively comprises respective portions of a flowchart illustrating logic and operations performed during a lightpath reservation operations, according to one embodiment of the present invention.

With reference to the flowchart of FIGS. 15a and 15b, operations and logic performed during a PBS label-based lightpath reservation process in accordance with one embodiment of the invention proceeds as follows. The process begins at a source node (e.g., source node A), which initiatives the first operation in a block 1501, wherein a lightpath between the source and destination nodes is selected. For example, the RSVP-TE (IETF RFC 3209) protocol may be used in one embodiment to automatically determine one or more lightpaths from which to choose a selected lightpath. In this instance, the IP address of the destination node is provided, and the protocol navigates the network topology from the source node to the destination node to determine lightpath segment combinations that may be connected to reach the destination node. Optionally, an explicit route corresponding to a lightpath that traverses a plurality of lightpath segments may be specified using the EXPLICIT_ROUTE object, which encapsulates a concatenation of hops which constitutes the explicitly routed path. Lightpath selection techniques of this sort are well-known in the art, so no further explanation of how this operation is performed is included herein. In accordance with the current example, a lightpath traversing lightpath segments LP1 to LP4 to LP6 is selected.

In a block 1502, an initial PBS label for a first lightpath segment (LP1) between the source node and the first switching node (node B) is created. As shown in FIG. 13 and discussed above, the label identifies an input fiber port, input wavelength, and lightpath segment ID corresponding to lightpath segment LP1. A resource reservation request containing the initial PBS label is then sent to the first switching node. In one embodiment, the passing of the resource reservation request between nodes is performed via a signaling packet.

The next set of operations and logic are performed in a looping manner, as indicated by start and end loop blocks 1503 and 1504, starting at switching node B, which comprises the first switching node on the ingress side of the lightpath. The operations defined between start and end loop blocks 1503 and 1504 are performed in an iterative manner for each switching node, until the last lightpath segment has been evaluated for availability. As used herein, the term "current node" identifies that the operations are being performed at a node for which the evaluated lightpath segment is received. The term "next node" represents the next node in the lightpath chain. When the logic loops back to start loop block 1503 from end loop block 1503, the next node becomes the current node.

In a block 1506 the resource reservation request received by the node is accessed to identify the current lightpath segment. In a decision block 1508, a determination is made by the node to whether it has sufficient resources to satisfy the request. In addition to the label information, the resource reservation request specifies a timeframe for which the reservation corresponds. An indication of sufficient resources means that the specified resource (i.e., the lightpath segment received at the current node) has not been previously scheduled for use over any portion of the specified timeframe. If sufficient resources are not available, the answer to decision block 1508 is NO, and the logic proceeds to a block 1510 in which an error message is sent back to the originator of the request (i.e., the source node). In response, the source node performs an appropriate action, such as sending a new request via another lightpath.

If there are sufficient resources to satisfy the reservation request, the logic proceeds to a block 1514 in which a soft reservation is made for the current lightpath segment. In one embodiment, the soft reservation is stored in a reservation table, such as that described below in further detail, wherein an exemplary soft reservation table entry is shown at time instance 1406A in FIG. 14. The soft reservation contains a reference to the current lightpath segment, via a Lightpath Segment ID field 1414. This reference will be subsequently used during fast routing lookup table operations in accordance with control bursts.

Next, a determination is made in a decision block 1515 to whether the destination node has been reached. If it has, the logic proceeds to the next portion of the flowchart illustrated in FIG. 15b. If it has not, the logic proceeds to a block 1516, wherein the PSB label is updated for the next lightpath segment. Exemplary labels are shown at the lower portion of FIG. 14 and discussed below. The updated label will now reference the lightpath segment ID for the next lightpath segment in the change, including new input fiber port, and wavelength values. The resource reservation request containing the updated label is then forwarded to the next node via the signaling mechanism in accordance with end loop block 1504. As discussed above, the operations in blocks 1506, 1508, 1510, 1512, 1514, 1515, and 1516 are then repeated, as appropriate, in an iterative manner until the destination node is reached, resulting in a YES result for decision block 1515.

Figure 15B:
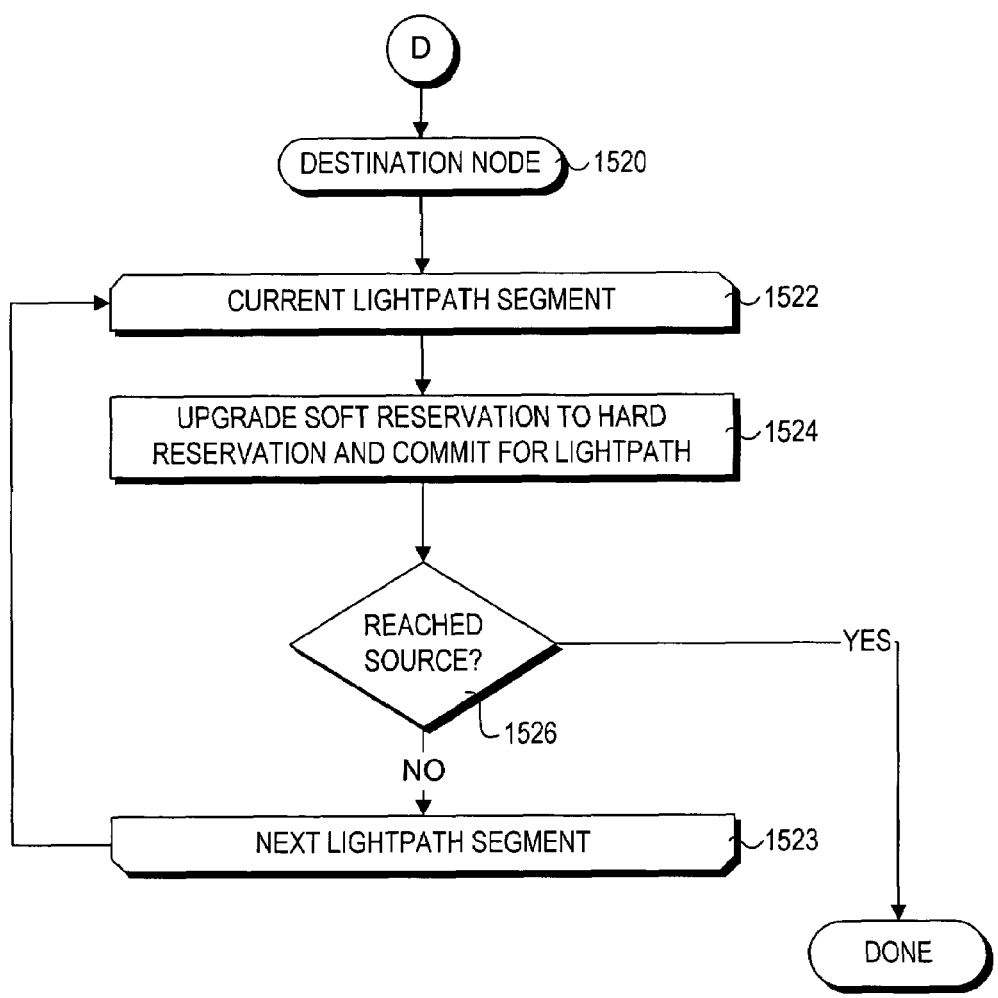

Proceeding to the portion of the flowchart shown in FIG. 15b, at this point the current node is the destination node D, as depicted by a start block 1520. As before, operations are repeated for each of the nodes along the selected lightpath, akin to a back-propagation technique; these operations are delineated by start and end loop blocks 1522 and 1523. First, in a block 1524, the software reservation for the current node is upgraded to a hard reservation, and the corresponding resources are committed. This is reflected by changing the value in a reservation status (Status) field 1420 from a "0" (soft) to a "1" (hard).

Following the operation of block 1526, a determination is made to whether the source node has been reached. If it has, the process is completed, and all segments on the lightpath are reserved for a subsequent scheduled use. If not, the process repeats itself for the next (now current) switching node until the source node is reached. At this point, all the nodes along the lightpath will have hard (i.e., confirmed) reservations, and the entire lightpath will be scheduled for use during the indicated timeframe contained in the reservation table.

Time-based instances (i.e., time snapshots) 1406A and 1406B of an exemplary reservation table are shown in FIG. 14. The reservation table includes a (optional) key field 1408, an input fiber port 1410, an input wavelength field 1412, lightpath segment ID field 1414, a start time field 1416, and end time field 1418, and reservation status field 1420. In addition to the fields shown, the reservation table may typically include other related information. Furthermore, for illustrative purposes only a time of day value is shown in the start and end time fields. Actually fields would include information identifying the date, or the start and end times could be further divided such that start and end date fields are provided.

When the PBS label information is transmitted (e.g., from node A to node D), a soft reservation is made at nodes B, C, and D, as described above. Time instance 1406A corresponds to a snapshot of the reservation table at node C is shown in FIG. 14 shortly after a soft reservation has been made. In this case, the reservation status (Status) field value, which comprises a Boolean value, is set to 0, indicating the reservation is not confirmed (i.e., a soft reservation). In time instance 1406B corresponds to the change in the table that is made to reservation status field 1420 when the reservation is confirmed on the return path from node D to node A).

As further indicated by the labels depicted in FIG. 14, the labels for a given node pair may change over time to reflect a change in the lightpath routing or network topology. Consider the PBS label values for times $t_0$ and $t_1$. The PBS labels at $t_0$ indicate a lightpath route of LP1 to LP4 to LP6, using wavelengths of 197.2 THz, 196.4 THz, and 195.6 THz, respectively. In contrast, at $t_1$ a portion of the routing path and frequencies have been changed, such that the lightpath route is LP1 to LP4 to LP5, using wavelengths of 197.2 THz, 195.6 THz, and 195.6 THz.

Figure 16:
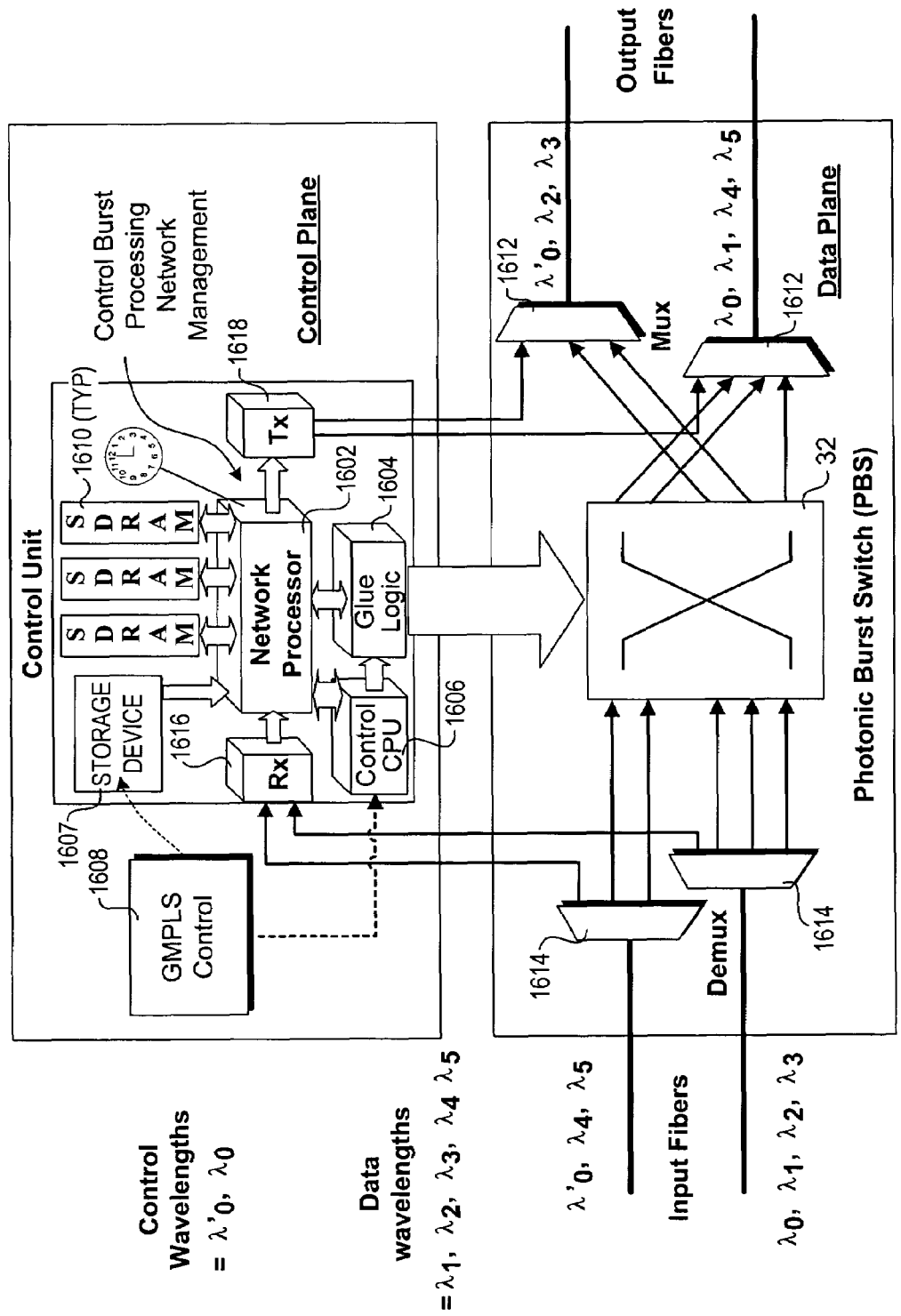
FIG. 16 is a schematic diagram of a PBS switching node architecture, according to one embodiment of the invention.

A simplified block diagram 1600 of a PBS switching node architecture in accordance with one embodiment is shown in FIG. 16. The intelligent switching node architecture is logically divided into control plane components and data plane. The control plane includes a control unit 37 employing a network processor (NP) 1602, coupled to glue logic 1604 and a control processor (CPU) 1606 that runs software components stored in a storage device 1607 to perform the GMPLS control operations 1608 disclosed herein. Network processor 1602 is also coupled to one or more banks of SDRAM (synchronous dynamic random access memory) memory 1610, which is used for general memory operations. The data plane architecture comprises a non-blocking optical switch fabric comprising a PBS 32, coupled optical multiplexers 1612, de-multiplexers 1614, and optical transceivers (as depicted by an optical receiver (Rx) block 1616 and an optical transmitter (Tx) block 1618).

The burst assembly and framing, burst scheduling and control, which are part of the PBS MAC layer and related tasks are performed by network processor 1602. Network processors are very powerful processors with flexible microarchitecture that are suitable to support wide-range of packet processing tasks, including classification, metering, policing, congestion avoidance, and traffic scheduling. For example, the Intel® IXP2800 NP, which is used in one embodiment, has 16 microengines that can support the execution of up to 1493 microengines instructions per packet at a packet rate of 15 million packets per second for 10 GbE and a clock rate of 1.4 GHz.

In one embodiment, the optical switch fabric has strictly non-blocking space-division architecture with fast (<100 ns) switching times and with limited number of input/output ports (e.g., ≈8×8, 12×12). Each of the incoming or outgoing fiber links typically carries only one data burst wavelength. The switch fabric, which has no or limited optical buffering fabric, performs statistical burst switching within a variable-duration time slot between the input and output ports. The optical buffering can be implemented using fiber-delay-lines (FDLs) on several unused ports, such as taught in L. Xu, H. G. Perros, and G. Rouskas, "Techniques for Optical Packet Switching and Optical Burst Switching," *IEEE Communication Magazine* 1, 136-142 (2001). The specific optical buffering architecture, such as feed-forward or feedback, will generally depend on the particular characteristics of the switching node and PBS network in which it is deployed. However, the amount of buffering is expected to be relatively small compared with conventional packet switching fabric, since the FDLs can carry multiple data burst wavelengths. Other possible contention resolution schemes include deflection routing and using tunable wavelength converters, as discussed above. In one embodiment, contention resolution schemes disclosed by D. J. Blumenthal, B. E. Olson, G. Rossi, T. E. Dimmick, L. Rau, M. Masanovic, O. Lavrova, R. Doshi, O. Jerphagnon, J. E. Bowers, V. Kaman, L. Coldren, and J. Barton, "All-Optical Label Swapping Networks and Technologies," IEEE *J. of Lightwave Technology* 18, 2058-2075 (2000) may be implemented. The PBS network can operate with a relatively small number of control wavelengths ($\lambda'_0$, $\lambda_0$), since they can be shared among many data wavelengths. Furthermore, the PBS switch fabric can also operate with a single wavelength and multiple fiber; however, further details of this implementation are not disclosed herein.

The control bursts can be sent either in-band (IB) or out of band (OOB) on separate optical channels. For the OOB case, the optical data bursts are statistically switched at a given wavelength between the input and output ports within a variable time duration by the PBS fabric based on the reserved switch configuration as set dynamically by network processor 1602. NP 1602 is responsible to extract the routing information from the incoming control bursts, providing fix-duration reservation of the PBS switch resources for the requested data bursts, and forming the new outgoing control bursts for the next PBS switching node on the path to the egress node. In addition, the network processor provides overall PBS network management functionality based on then extended GMPLS-based framework discussed above. For the IB case, both the control and data bursts are transmitted to the PBS switch fabric and control interface unit. However, NP 1602 ignores the incoming data bursts based on the burst payload header information. Similarly, the transmitted control bursts are ignored at the PBS fabric since the switch configuration has not been reserved for them. One advantage of this approach is that it is simpler and cost less to implement since it reduces the number of required wavelengths.

Another approach for IB signaling is to use different modulation formats for the control bursts and the data bursts. For example, the control bursts are non-return to zero (NRZ) modulated while the data bursts are return to zero (RZ) modulated. Thus, only the NRZ control bursts are demodulated at the receiver in the PBS control interface unit while the RZ data bursts are ignored.

Embodiments of method and apparatus for implementing a photonic burst switching network are described herein. In the above description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable optical manner in one or more embodiments.

Thus, embodiments of this invention may be used as or to support software program executed upon some form of processing core (such as the CPU of a computer or a processor of a module) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

In the foregoing specification, embodiments of the invention have been described. It will, however, be evident that various modifications and changes may be made thereto without departing from the broader spirit and scope as set forth in the appended claims. The specification and drawings are, accordingly, to be regarded in an illustrative rather than a restrictive sense.

What is claimed is:

1. A method for establishing a reservation of a lightpath traversing a plurality of lightpath segments coupled between nodes in an optical switched network, comprising:

passing a resource reservation request containing a generalized multi-protocol label-switching (GMPLS)-based label to each of the nodes traversed by the lightpath;

updating a segment ID field of the GMPLS-based label at each of the nodes to identify one of the plurality of lightpath segments to which each of the nodes is coupled; and reserving each of the of lightpath segments along the lightpath for a scheduled timeframe by updating a reservation table maintained in each of the nodes with a respective lightpath segment reservation, wherein each lightpath segment reservation references its corresponding lightpath segment using the segment ID field contained in the GMPLS-based label, wherein the GMPLS-based label includes at least one field identifying an input wavelength employed for carrying the signals over the lightpath segment identified by the GMPLS-based label, wherein the input wavelength is defined by a value stored in the IEEE standard 754 single precision floating point format, wherein the input wavelength is based on a function of a channel spacing variable, and the GMPLS-based label includes a wavelength field and a channel spacing field to store a channel spacing value.

2. The method of claim 1, wherein the optical switched network comprises a photonic burst switched (PBS) network.

3. The method of claim 2, wherein the optical burst switched network comprises a wavelength-division multiplexed (WDM) PBS network.

4. The method of claim 1, wherein the GMPLS-based label includes an input fiber port field identifying an input fiber port of a node at a receiving end of the lightpath segment identified by the GMPLS-based label.

5. The method of claim 1, wherein the method is performed by:

selecting a selected lightpath route comprising a plurality of lightpath segments coupled between the plurality of nodes, said lightpath route beginning with a source node and ending with a destination node and including at least one switching node between the source and destination nodes;

traversing lightpath segments on the selected lightpath route;

generating a GMPLS-based label for each lightpath segment; and employing that GMPLS-baaed label for a corresponding lightpath segment to reserve that lightpath segment for the scheduled timeframe.

6. The method of claim 5, wherein the method includes:

determining, at each node along the selected lightpath route, whether the lightpath segment received at that node and a corresponding network resource are available for use during the scheduled timeframe; and reserving a network resource for a given lightpath segment for the scheduled timeframe if it is available, otherwise providing indicia to the source node to indicate the network resource for the given lightpath segment is unavailable for the scheduled timeframe.

7. The method of claim 5, wherein the selected lightpath route comprises a first selected lightpath route, the method further comprising:

selecting a second selected lightpath route;

determining, at each node along the second selected lightpath route, whether the lightpath segment received at that node is available for use during the scheduled timeframe; and reserving a given lightpath segment for the scheduled timeframe if it is available, otherwise providing indicia to the source node to indicate the given lightpath segment is unavailable for the scheduled timeframe.

8. The method of claim 5, wherein the method includes:

performing a forward traversal of the selected lightpath route from the source node to the destination node;

determining, at each node along the forward traversal, whether the lightpath. segment received at that node is available for use during the scheduled timeframe; and temporarily reserving a network resource for a given lightpath segment for the scheduled timeframe with a soft reservation if it is determined to be available;

determining if all of the lightpath segments along the selected lightpath route and network resources are available for use during the scheduled timeframe; and committing the soft reservations for each lightpath segment if it is determined that all of the lightpath segment network resources are available for use during the scheduled timeframe.

9. The method of claim 8, wherein the soft reservation are committed by:

performing a reverse traversal of the selected lightpath route from the destination node back to the source node;

setting the soft reservation corresponding to a given lightpath segment to a hard reservation as the node corresponding to that lightpath segment is encountered during the reverse traversal.

10. The method of claim 1, wherein data corresponding to the reservation of the lightpath is stored in a reservation lookup table, the method further comprising:

sending a control burst, during a given timeframe, across the optical switched network from a source node to a destination node; and looking up, in the reservation lookup table, appropriate lightpath segments via which the control burst is to be routed to traverse a lightpath linking the source and destination nodes based on lightpath segment and resource reservations corresponding to the given timeframe.

11. A switching apparatus for use in an optical switched network, comprising:

optical switch fabric, having at least one input fiber port and at least one output fiber port; and a control unit, operatively coupled to control the optical switch fabric, including at least one processor and a storage device operatively coupled to said at least one processor containing machine-executable instructions, which when executed by said at least one processor perform operations, including:

receiving a resource reservation request from a first node, said resource reservation request including a first generalized multi-protocol label-switching (GMPLS)-based label identifying a first lightpath segment between the first node and the switching apparatus, which comprises a second node, wherein the GMPLS-based label includes a segment ID field to identify the first lightpath segment; and scheduling a coarse-grained time-reserved use of the first lightpath segment for subsequent transmission of data via the first lightpath segment, wherein the first GMPLS-based label includes at least one field identifying a wavelength employed for carrying signals over the first lightpath segment, wherein the input wavelength is defined by the IEEE standard 754 single precision floating point format, wherein the input wavelength is based on a function of a channel spacing variable, and the first GMPLS-based label includes a wavelength field and a channel spacing field to store a channel spacing value.

12. The switching apparatus of claim 11 wherein execution of the instructions further performs the operations of:

creating a second GMPLS-based label identifying a second lightpath segment between the switching apparatus and a third node;

replacing the first GMPLS-based label in the resource reservation request; and forwarding the resource reservation request to the third node.

13. The switching apparatus of claim 11, wherein the optical switched network comprises a photonic burst switched (PBS) network.

14. The switching apparatus of claim 13, wherein the optical switched network comprises a wavelength-division multiplexed (WDM) PBS network; and the optical switching fabric provides switching of optical signals comprising different wavelengths carried over common fibers that may be respectively coupled to said at least one input fiber port and said at least one output fiber port.

15. The switching apparatus of claim 11, wherein the first GMPLS-based label includes an input fiber port field identifying an input fiber port of the switching apparatus corresponding to an end of the first lightpath segment.

16. The switching apparatus of claim 11, wherein execution of the instructions further performs the operation of storing a time-reserved use of the first lightpath segment that is scheduled in a reservation table maintained by the switching apparatus.

17. The switching apparatus of claim 11, wherein said at least one processor includes a network processor.

18. The switching apparatus of claim 17, wherein said at least one processor further includes a control processor.

* * * * *